(12) United States Patent
Takahashi et al.

(10) Patent No.: US 10,162,125 B2
(45) Date of Patent: Dec. 25, 2018

(54) PLUG-SIDE OPTICAL CONNECTOR AND OPTICAL CONNECTOR SYSTEM

(71) Applicant: FUJIKURA LTD., Tokyo (JP)

(72) Inventors: Shigeo Takahashi, Chiba (JP); Seiji Kato, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/556,071

(22) PCT Filed: Nov. 30, 2015

(86) PCT No.: PCT/JP2015/083574
§ 371 (c)(1),
(2) Date: Sep. 6, 2017

(87) PCT Pub. No.: WO2016/143202
PCT Pub. Date: Sep. 15, 2016

(65) Prior Publication Data
US 2018/0045894 A1    Feb. 15, 2018

(30) Foreign Application Priority Data

Mar. 6, 2015 (JP) ................................ 2015-044420
Mar. 6, 2015 (JP) ................................ 2015-044428
(Continued)

(51) Int. Cl.
*G02B 6/38*    (2006.01)
*G02B 6/44*    (2006.01)

(52) U.S. Cl.
CPC ........... *G02B 6/387* (2013.01); *G02B 6/3801* (2013.01); *G02B 6/3849* (2013.01);
(Continued)

(58) Field of Classification Search
None
See application file for complete search history.

(56) References Cited

U.S. PATENT DOCUMENTS 4,190,316 A * 2/1980 Malsby ................... G02B 6/32
                                                        24/27
4,896,939 A * 1/1990 O'Brien ............... G02B 6/3816
                                                        174/110 R
(Continued)

FOREIGN PATENT DOCUMENTS

JP    H09-178979 A    7/1997
JP    H10-227946 A    8/1998
(Continued)

OTHER PUBLICATIONS

English translation of written opinion for PCT/JP2015/083574, dated Feb. 23, 2016.*
(Continued)

*Primary Examiner* — Michael Stahl
(74) *Attorney, Agent, or Firm* — Osha Liang LLP

(57) ABSTRACT

A plug-side optical connector includes: an insertion section that is inserted inside a cylindrical coupling section of a receptacle-side optical connector; a rotation section that is coupled to the coupling section of the receptacle-side optical connector; and a waterproofing member disposed on an outer peripheral surface of the insertion section inside the rotation section to contact an inner peripheral surface of the coupling section of the receptacle-side optical connector when the insertion section is inserted inside the coupling section of the receptacle-side optical connector. The rotation section is rotatable outside the insertion section.

22 Claims, 12 Drawing Sheets

(30) Foreign Application Priority Data

Mar. 6, 2015 (JP) .................................. 2015-044440
Mar. 6, 2015 (JP) .................................. 2015-044445

(52) U.S. Cl.
CPC ......... *G02B 6/3877* (2013.01); *G02B 6/3891* (2013.01); *G02B 6/3887* (2013.01); *G02B 6/3897* (2013.01); *G02B 6/4433* (2013.01)

(56) References Cited

U.S. PATENT DOCUMENTS

| | | | |
|---|---|---|---|
| 5,963,692 A | 10/1999 | Marazzi et al. | |
| 6,648,520 B2 | 11/2003 | McDonald et al. | |
| 7,137,742 B2 | 11/2006 | Theuerkorn et al. | |
| 7,572,065 B2 | 8/2009 | Lu et al. | |
| 7,881,576 B2 | 2/2011 | Melton et al. | |
| 2004/0247251 A1* | 12/2004 | Rubino ................ | G02B 6/3831 385/58 |
| 2009/0148101 A1* | 6/2009 | Lu ....................... | G02B 6/3816 385/56 |
| 2011/0211792 A1 | 9/2011 | Koreeda et al. | |

FOREIGN PATENT DOCUMENTS

| | | | |
|---|---|---|---|
| JP | H11-305071 A | | 11/1999 |
| JP | 2011-180238 A | | 9/2011 |
| JP | 2012-18253 A | * | 1/2012 |
| JP | 2013-200436 A | | 10/2013 |
| JP | 2014-153511 A | | 8/2014 |

OTHER PUBLICATIONS

Notification of Transmittal of Translation of the International Preliminary Report on Patentability for corresponding Application No. PCT/JP2015/083574, dated Sep. 21, 2017 (9 pages).

Office Action issued in corresponding Canadian Application No. 2,978,049 dated May 11, 2018 (4 pages).

Office Action issued in corresponding Japanese Application No. 2015-044420 dated Sep. 28, 2018 (5 pages).

Office Action issued in corresponding Chinese Application No. 201580077330.3 dated Oct. 16, 2018 (8 pages).

* cited by examiner

US 10,162,125 B2

PLUG-SIDE OPTICAL CONNECTOR AND OPTICAL CONNECTOR SYSTEM

TECHNICAL FIELD

The present invention relates to a plug-side optical connector and an optical connector system.

BACKGROUND

An optical connector system configured by a receptacle-side optical connector and a plug-side optical connector is known. When the plug-side optical connector is connected to the receptacle-side optical connector, a ferrule on the plug side abuts a ferrule on the receptacle side so as to make an optical connection.

Patent Literatures 1 to 4 describe optical connector systems including a receptacle-side optical connector and a plug-side optical connector. Note that these literatures also describe that a member is sealed with an O-ring. Further, these literatures also describe a spring (elastic member) that applies pressing force to a plug-side ferrule. Moreover, these literatures also describe a housing and the like that covers optical fibers (naked fibers) extending from a ferrule.

PATENT LITERATURE

Patent Literature 1: U.S. Pat. No. 7,881,576
Patent Literature 2: U.S. Pat. No. 6,648,520
Patent Literature 3: U.S. Pat. No. 7,137,742
Patent Literature 4: U.S. Pat. No. 7,572,065

SUMMARY

In order to connect a receptacle-side optical connector and a plug-side optical connector together, coupling sections on both connectors are coupled together. In cases in which bayonet-type, that is, BNC-type (bayonet-type) coupling sections, for example, are employed as the coupling sections of the optical connectors, a rotation section capable of rotating at the outside of an insertion section is disposed on the coupling section of the plug-side optical connector. However, due to there being no configuration corresponding to a rotation section on the coupling sections of the optical connectors described in Patent Literatures 1 to 4, the placement of the O-ring (waterproofing member) described in these literatures is not placement that considers a rotation section.

One or more embodiments of the present invention place a waterproofing member appropriately on a plug-side optical connector provided with a coupling section including a rotation section, so as to obtain high waterproof performance.

One or more embodiments of the present invention relate to a plug-side optical connector increasing: an insertion section configured to be inserted inside a cylindrical coupling section of a receptacle-side optical connector; and a rotation section configured to couple to the coupling section of the receptacle-side optical connector and to be rotatable outside the insertion section; a waterproofing member being placed on an outer peripheral surface of the insertion section inside the rotation section so as to contact an inner peripheral surface of the coupling section of the receptacle-side optical connector when the insertion section is inserted inside the coupling section of the receptacle-side optical connector.

Other features of the invention will be made clear by the following description of the present specification and the accompanying drawings.

According to one or more embodiments of the present invention, a waterproofing member can be appropriately placed on a plug-side optical connector provided with a coupling section including a rotation section, enabling high waterproof performance to be obtained.

BRIEF DESCRIPTION OF DRAWINGS

FIG. 1A is a perspective view of a receptacle-side optical connector 100 according to one or more embodiments.

FIG. 1B is a perspective view of a plug-side optical connector 10 according to one or more embodiments.

FIG. 4A is a cross-sectional view of an optical cable 3 according to one or more embodiments.

FIG. 4B is a perspective view of the optical cable 3 according to one or more embodiments.

DETAILED DESCRIPTION

Figure 1:
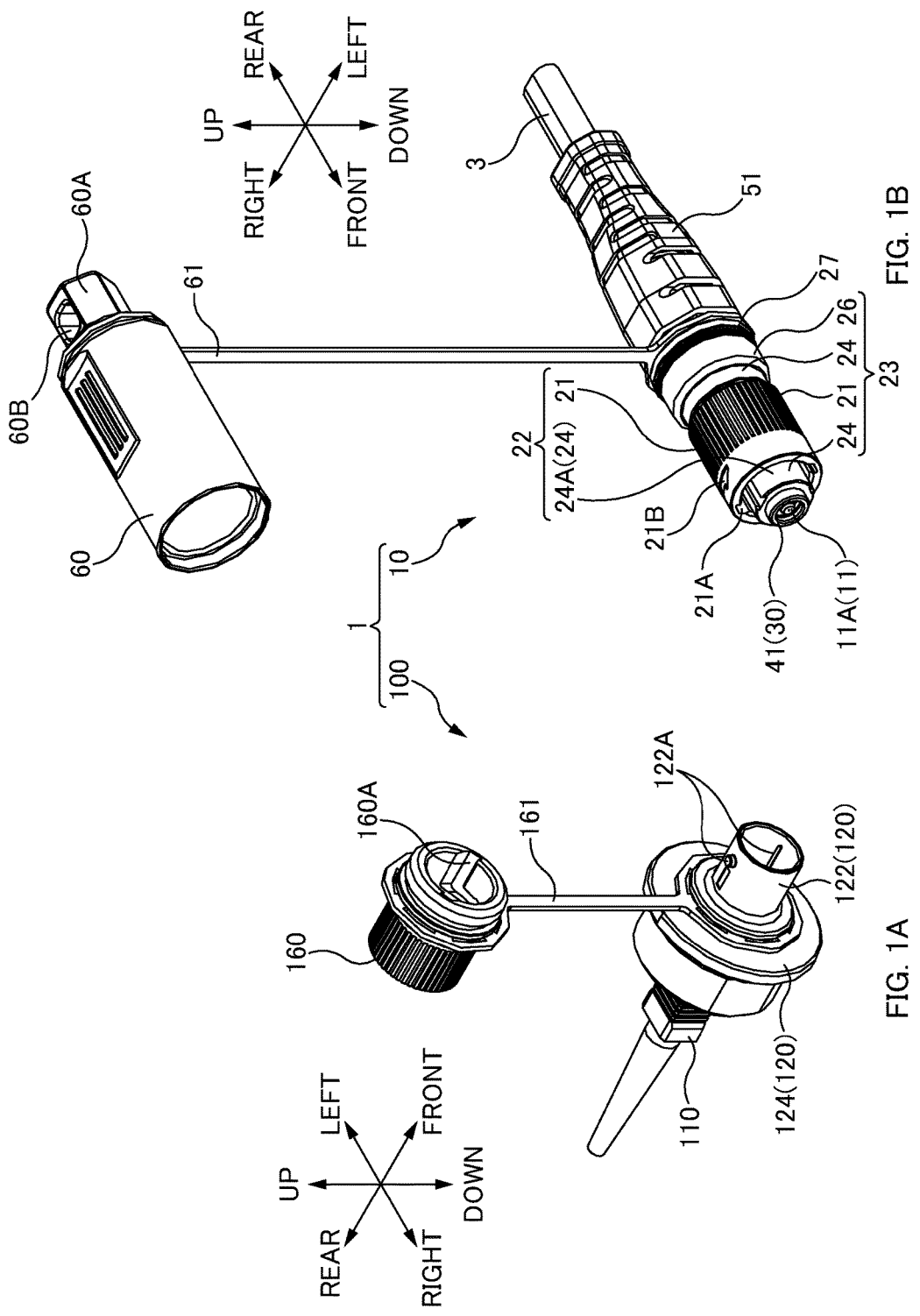
FIG. 1A and FIG. 1B are explanatory diagrams of an optical connector system 1 according to one or more embodiments.

At least the following matters will be made clear by the following description of the present specification and the accompanying drawings.

(1)

A plug-side optical connector is made clear in which the plug-side optical connector includes an insertion section configured to be inserted inside a cylindrical coupling section of a receptacle-side optical connector; and a rotation section configured to couple to the coupling section of the receptacle-side optical connector and to be rotatable outside the insertion section; a waterproofing member being placed on an outer peripheral surface of the insertion section inside the rotation section so as to contact an inner peripheral surface of the coupling section of the receptacle-side optical connector when the insertion section is inserted inside the coupling section of the receptacle-side optical connector. This enables a waterproofing member to be appropriately placed on a plug-side optical connector provided with a coupling section including a rotation section, so that high waterproof performance can be achieved.

In one or more embodiments, the insertion section is formed to a housing, and another waterproofing member different from the waterproofing member is placed on an outer peripheral surface of the housing so as to contact an inner peripheral surface of a cap when the cap is installed to cover the insertion section and the rotation section. This enables both waterproofing of the optical connection section and protection of the coupling section to be achieved when capped.

In one or more embodiments, the housing is configured by a front housing on a side of the receptacle-side optical connector and a rear housing on the opposite side to the side of the receptacle-side optical connector, and yet another waterproofing member is placed at a connection section between the front housing and the rear housing. This enables waterproofing of the interior of the housing.

In one or more embodiments, a projection is formed at an inside of a cylindrical coupling section of the receptacle-side optical connector, a groove for the projection is formed on the outer peripheral surface of the insertion section, and the waterproofing member is placed on the opposite side to the side of the receptacle-side optical connector as viewed from the groove. This enables water to be suppressed from infiltrating through the groove.

It is made clear an optical connector system including a receptacle-side optical connector and a plug-side optical connector, the receptacle-side optical connector including a cylindrical coupling section, the plug-side optical connector including an insertion section configured to be inserted inside the cylindrical coupling section of the receptacle-side optical connector, a rotation section configured to couple to the coupling section of the receptacle-side optical connector and to be rotatable outside the insertion section, a waterproofing member being placed on an outer peripheral surface of the insertion section inside the rotation section so as to contact an inner peripheral surface of the coupling section of the receptacle-side optical connector when the insertion section is inserted inside the coupling section of the receptacle-side optical connector. This enables a waterproofing member to be appropriately placed on a plug-side optical connector provided with a coupling section including a rotation section, so that high waterproof performance can be achieved.

(2)

In Patent Literatures 1 to 4, a spring that imparts pressing force to a plug-side ferrule is placed on a rear side with respect to a flange section of the ferrule (on the opposite side to the receptacle-side optical connector side). Thus, when assembling the optical connectors of Patent Literatures 1 to 4, the spring needs to be inserted in advance over the optical fiber or the optical cable before attaching the ferrule to the optical fiber. As a result, not only does the operation of assembling the optical connector become complicated, but in cases in which optical fiber fusion is required, the optical fiber need to be set in a fusion device in a state that the spring has been inserted, and a long optical fiber needs to protrude from the optical cable. Accordingly, the size of the optical connector is increased.

One or more embodiments achieve a simple operation of assembling an optical connector, while also achieving a compact optical connector.

At least the following matters will be made clear by the following description of the present specification and the accompanying drawings.

A plug-side optical connector is made clear in which the plug-side optical connector includes a plug-side coupling section configured to couple to a coupling section of a receptacle-side optical connector, a ferrule including a flange section, a housing covering at least a portion of an optical fiber extending from the ferrule, and an elastic member that is placed on the side of the receptacle-side optical connector with respect to the flange section, the elastic member being compressed and deformed between the housing and the receptacle-side optical connector to generate repulsion force when connected to the receptacle-side optical connector. According to such a plug-side optical connector, assembly operation is made simple and the optical connector can be made more compact.

In one or more embodiments, the plug-side coupling section is configured by a bayonet-type coupling mechanism. Accordingly, coupling of the coupling section can be less likely to be released due to repulsion force of an elastic member.

In one or more embodiments, the ferrule is inserted into a split sleeve of the receptacle-side optical connector when connected to the receptacle-side optical connector. This is particularly advantageous in such circumstances.

In one or more embodiments, the elastic member is attachable to the side of the receptacle-side optical connector of the housing after an optical fiber to which the ferrule has been attached in advance and an optical fiber protruding from an optical cable are fused together. This enables the assembly operation to be made simple, and enables the optical connector to be more compact.

In one or more embodiments, the housing is attachable to a protruding portion of the optical cable after an optical fiber to which the ferrule has been attached in advance and the optical fiber protruding from the optical cable are fused together. This enables the assembly operation to be made simple, and enables the optical connector to be more compact.

In one or more embodiments, the housing includes an insertion hole through which the optical fiber is inserted, and the insertion hole has a size such that the optical cable is not able to be inserted therein and such that the ferrule is able to pass through. This enables the optical connector to be more compact.

In one or more embodiments, another housing is provided on the side of the receptacle-side optical connector of the elastic member so as to cover at least a part of the ferrule. This enables the ferrule to be protected, and enables the elastic member to be suppressed from making direct contact with the receptacle-side optical connector.

In one or more embodiments, a housing includes a pressing section pressing the flange section of the ferrule from the opposite side to the side of the receptacle-side optical connector. This enables movement of the ferrule to be suppressed, and space for enabling the ferrule to be retracted is not needed. Accordingly, the optical connector can be made compact.

A optical cable with an connector to which a plug-side optical connector is attached at an end section is made clear, in which the plug-side optical connector includes a plug-side coupling section that couples to a coupling section of a receptacle-side optical connector; a ferrule including a flange section; a housing covering at least a part of an optical fiber extending from the ferrule; and an elastic member that is placed on the side of the receptacle-side optical connector with respect to the flange section, the elastic member being compressed and deformed between the housing and the receptacle-side optical connector to generate repulsion force when connected to the receptacle-side optical connector. Such an optical cable with a connector enables the assembly operation to be made simple, and enables the optical connector to be more compact.

(3)

As a method of fixing a housing to an optical cable, there is a method in which a metal member is crimped with a tool. However, in the method in which a metal member is crimped, the metal member needs to be inserted in advance into the optical cable when the optical cable is being assembled, thus making the assembly operation complicated.

Moreover, Patent Literature 4 describes bonding two components (a main body 36 and a cover 41) having half-split structures to tensile strength members of an optical cable, and wiping away any adhesive spilling from a bleed opening (reference sign 122). However, in Patent Literature 4, due to the two components of half-split structure (the main body 36 and the cover 41) being assembled after being coated in advance with adhesive, it is thought that workability is not good.

One or more embodiments are able to fix a housing of an optical connector to tensile strength members of an optical cable simply.

At least the following matters will be made clear by the following description of the present specification and the accompanying drawings.

An optical connector to be attached to an end section of an optical cable that includes an optical fiber and a tensile strength member is made clear. The optical connector includes a ferrule retaining an end section of the optical fiber, and a fixing housing configured to be fixed to the optical cable while covering at least a part of an optical fiber extending from the ferrule, and the fixing housing includes an insertion hole with an internal capacity enabling the optical fiber and the tensile strength member to be placed therein, and an adhesive filling window that communicates the interior of the insertion hole with the exterior of the fixing housing and that enables an adhesive to be filled inside the insertion hole. Such an optical connector enables the housing of the optical connector to be simply fixed to the tensile strength member of the optical cable.

In one or more embodiments, the optical fiber is placed between two of the tensile strength members in the optical cable, and the adhesive filling window is formed to the fixing housing so as to open in a direction perpendicular to an arrangement direction of the two tensile strength members and a longitudinal direction of the optical cable. This facilitates an operation of applying adhesive onto the two tensile strength members.

In one or more embodiments, the adhesive filling window has a shape elongated along a longitudinal direction of the optical cable. This lengthens the region applied by the adhesive between the tensile strength members and an inner wall of the fixing housing, and achieves strong bonding and fixing between the two counterparts.

In one or more embodiments, a width of the adhesive filling window is wider than a width of the optical fiber. This improves visibility through the adhesive filling window, and facilitates the operation of applying the adhesive.

In one or more embodiments, two projections projecting toward the optical cable side are formed to a rear end section of the fixing housing, and that an outer covering of the optical cable having a flattened profile is gripped by the two projections. This enables positional misalignment of the fixing housing with respect to the optical cable prior to bonding to be suppressed, and facilitates the operation of filling the adhesive.

In one or more embodiments, the insertion hole has a size such that the optical cable is not able to be inserted therein and such that the ferrule is able to pass through. This enables the optical connector to be more compact.

An optical cable with a connector, which includes an optical fiber and a tensile strength member, and to which an optical connector is attached at an end section, is made clear. The optical connector includes a ferrule that is fixed with respect to the optical cable and that retains an end section of an optical fiber, and a fixing housing to be fixed to the optical cable while covering at least a part of an optical fiber extending from the ferrule, the fixing housing includes an insertion hole with an internal capacity enabling the optical fiber and the tensile strength member to be placed therein, and an adhesive filling window that communicates the interior of the insertion hole with the exterior of the fixing housing and that enables an adhesive to be filled inside the insertion hole, and the tensile strength member of the optical cable is fixed to the fixing housing by the adhesive filled inside the insertion hole. Such an optical cable with a connector enables the housing of the optical connector to be simply fixed to the tensile strength member of the optical cable.

(4)

In Patent Literatures 1 to 4, the spring (elastic member) that imparts pressing force to the plug-side ferrule is placed at the rear side of the plug-side ferrule (at the opposite side to the receptacle-side optical connector side), so that the plug-side ferrule is configured to be retractable. Since the plug-side ferrule abuts the ferrule of the receptacle-side optical connector when the connector is connected, the plug-side ferrule retracts (moves rearward) when the connector is connected. However, in such configurations, a space is needed to make the plug-side ferrule retractable, making it difficult to achieve a compact optical connector.

One or more embodiments provide a more compact optical connector.

At least the following matters will be made clear by the following description of the present specification and the accompanying drawings.

A plug-side optical connector configured to connect to a receptacle-side optical connector is made clear, in which the plug-side optical connector includes a plug-side ferrule that includes a flange section and is configured to abut a ferrule of the receptacle-side optical connector; and a housing that is fixed to an optical cable and includes a pressing section pressing the flange section of the plug-side ferrule from the opposite side to the side of the receptacle-side optical connector. This enables the optical connector to be more compact.

In one or more embodiments, the housing includes a fixing housing fixed to the optical cable, and a first housing and a second housing that are attached to the side of the receptacle-side optical connector of the fixing housing, the pressing section is formed to the first housing, after an optical fiber to which the plug-side ferrule is attached in advance and the optical fiber protruding from the optical cable have been fused together, the fixing housing is attached to the protruding portion of the optical cable, the first housing and the second housing are attached to the fixing housing, and the pressing section can be placed on the opposite side to the flange section. Accordingly, since the housing need not to be inserted over the optical fiber 5 prior to fusing, the operation of assembling the optical connector becomes simple and the optical connector can be made compact.

In one or more embodiments, engagement holes are formed in the fixing housing, and engagement tabs projecting toward the side of the fixing housing are formed to the first housing and the second housing to respectively engage with the engagement holes. This enables positional misalignment of the first housing and the second housing with respect to the fixing housing to be suppressed.

In one or more embodiments, the first housing is a half-cylinder shaped member, the second housing includes a half-cylinder section covering a part of the half-cylinder shaped first housing from the outside, and a guide section is formed on an outer peripheral surface of the first housing and on an inner peripheral surface of the half-cylinder section of the second housing, the guide section being formed along an attachment or detachment direction of the connector. This makes misalignment of the second housing with respect to the first housing not liable to occur.

In one or more embodiments, the second housing includes another pressing section that presses the flange section of the plug-side ferrule from the side of the receptacle-side optical connector. Since the plug-side ferrule is pressed from both sides, the position of the plug-side ferrule is thereby fixed.

One or more embodiments further include a plug-side coupling section that couples to a coupling section of a receptacle-side optical connector, and an elastic member that is placed on the side of the receptacle-side optical connector of the housing, the elastic member being compressed and deformed between the housing and the receptacle-side optical connector to generate repulsion force when connected to the receptacle-side optical connector. This enables the operation of assembling the optical connector to be made simple, and the optical connector can be made compact.

An optical connector system including a receptacle-side optical connector and a plug-side optical connector is made clear, in which the plug-side optical connector includes a plug-side ferrule that includes a flange section and is configured to abut a ferrule of the receptacle-side optical connector; and a housing that is fixed to an optical cable and includes a pressing section pressing the flange section of the plug-side ferrule from the opposite side to the side of the receptacle-side optical connector. This enables the optical connector to be made compact.

A optical cable with an connector to which a plug-side optical connector is attached at an end section is made clear, in which the plug-side optical connector includes a plug-side ferrule that includes a flange section and is configured to abut a ferrule of the receptacle-side optical connector; and a housing that is fixed to an optical cable and includes a pressing section pressing the flange section of the plug-side ferrule from the opposite side to the side of the receptacle-side optical connector. Accordingly, the optical connector to be attached to the end section of the optical cable can be made compact.

First, before describing the structure of an optical connector (a plug-side optical connector 10) of one or more embodiments, an outline description will be given regarding an optical connector system 1 that includes a receptacle-side optical connector 100.

<Optical Connector System 1 and Receptacle-Side Optical Connector 100>

Outline of Optical Connector System 1

Figure 2:
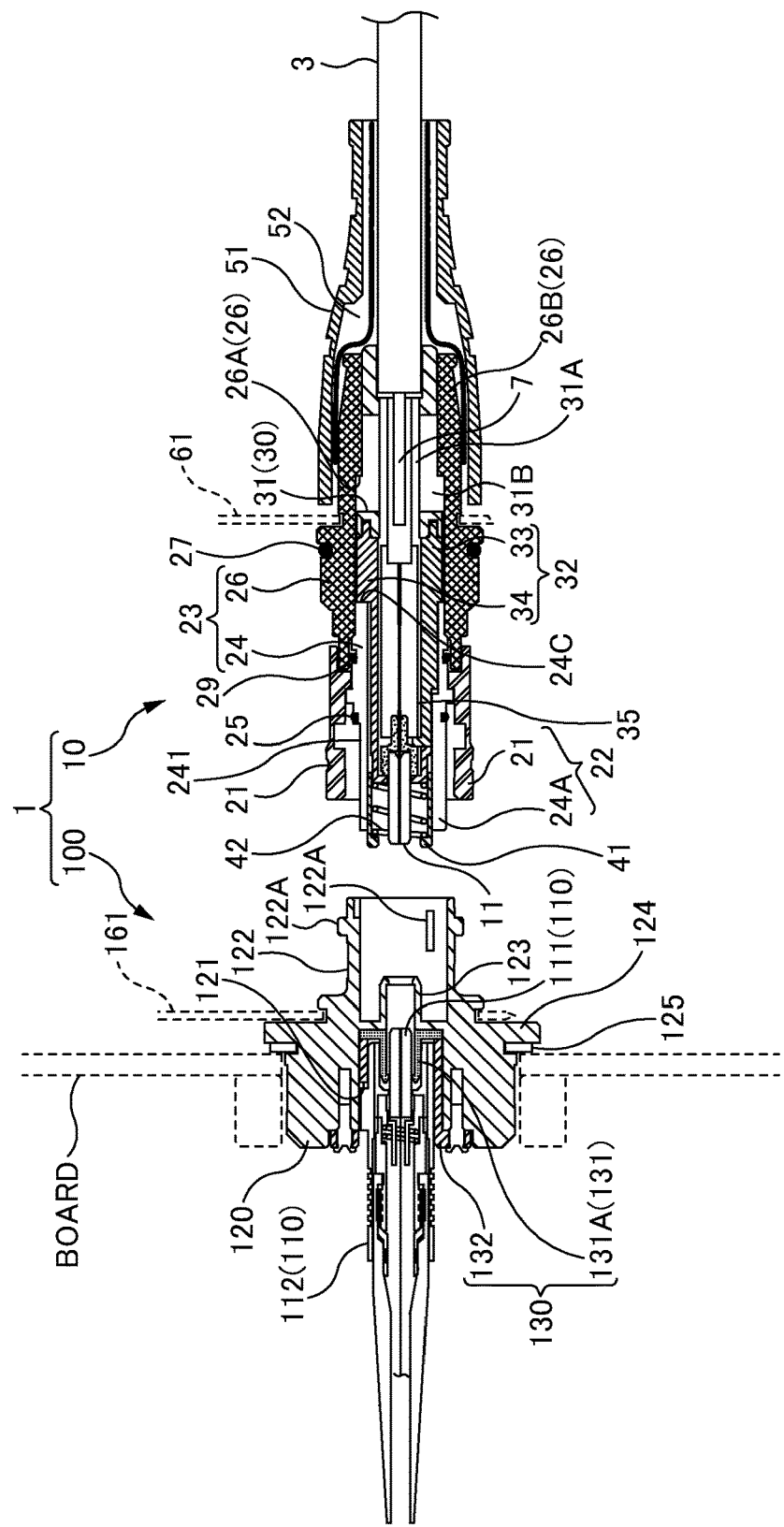
FIG. 2 is a cross-sectional view of the receptacle-side optical connector 100 and the plug-side optical connector 10 according to one or more embodiments.

FIG. 1A and FIG. 1B are explanatory diagrams of the optical connector system 1. FIG. 1A is a perspective view of the receptacle-side optical connector 100. FIG. 1B is a perspective view of the plug-side optical connector 10. FIG. 2 is a cross-sectional view of the receptacle-side optical connector 100 and the plug-side optical connector 10. As illustrated in FIG. 2, the optical connector system 1 includes the receptacle-side optical connector 100 and the plug-side optical connector 10. The receptacle-side optical connector 100 is sometimes referred to as a socket-side optical connector. The optical connector system 1 of one or more embodiments is intended to be mainly employed outdoors, and a cap 160 is attachable to and detachable from the receptacle-side optical connector 100 (similarly, a cap 60 is also attachable to and detachable from the plug-side optical connector 10).

In the following description, each direction is defined as shown in the figures. Namely, the "front-rear direction" is defined as being a direction along which the connector is attached or detached, "front" is defined as the side closer to a mating optical connector, and "rear" is the opposite side thereto. Note that the longitudinal direction of an optical fiber within the optical connector is the front-rear direction. Moreover, the "left-right direction" is defined as being a major axis direction (an arrangement direction of two tensile strength members 7 of the optical cable 3: see FIG. 4A) in a cross-section of a plug-side optical cable 3 having a flattened profile, with "right" defined as the right side when viewed from the rear toward the front, and "left" as the opposite side thereto. Moreover, a direction perpendicular to the front-rear direction and to the left-right direction is defined as the "up-down direction".

When the receptacle-side optical connector 100 and the plug-side optical connector 10 are connected together, end faces of a receptacle-side ferrule 111 and a plug-side ferrule 11 abut each other. The end faces of optical fibers thereby physically abut each other, so as to achieve an optical connection between the optical fibers.

Receptacle-Side Optical Connector 100

Figure 3:
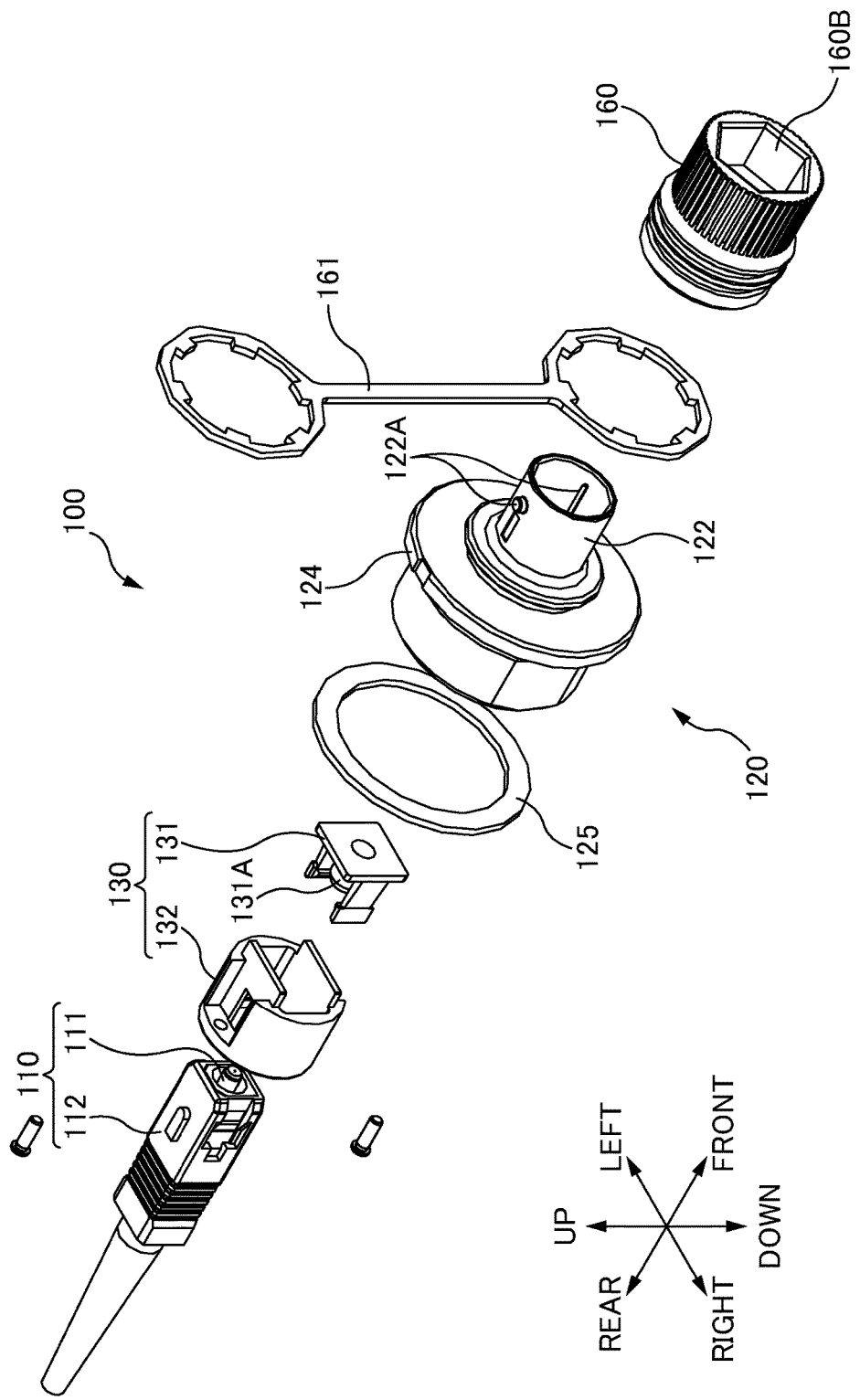
FIG. 3 is an exploded view of the receptacle-side optical connector 100 according to one or more embodiments.

FIG. 3 is an exploded view of the receptacle-side optical connector 100. A description of configuration of the receptacle-side optical connector 100 follows with reference to FIG. 1 to FIG. 3.

The receptacle-side optical connector 100 includes a connector main body 110, an outer housing 120, and an inner housing 130.

The connector main body 110 is a member that includes the ferrule 111 and a housing section 112. The ferrule 111 is a member that retains an end section of an optical fiber. A cylindrical zirconia ferrule 111 is employed here to retain an end section of a single core optical fiber. The housing section 112 is an accommodation section made from plastic to accommodate the ferrule 111. An SC connector, which is a general purpose connector, is employed here as the connector main body 110.

The outer housing 120 is a member that accommodates the connector main body 110 through the inner housing 130. Although the outer housing 120 accommodates the connector main body 110 through the inner housing 130 in this case, the outer housing 120 may accommodate the connector main body 110 without using the inner housing 130. The outer housing 120 includes an accommodation section 121, a coupling section 122, a front sleeve section 123, and a flange section 124.

The accommodation section 121 is a section accommodating the connector main body 110 and the inner housing 130. The accommodation section 121 is formed at the rear side of the outer housing 120.

The coupling section 122 is a section that couples to a plug-side coupling section 22 (a rotation section 21). A BNC-type (bayonet type) coupling mechanism, which is also employable as an electrical coaxial connector, is employed here as the coupling section 122. The receptacle-side coupling section 122 is accordingly configured with a cylindrical shape, and projections 122a are formed on both the outer peripheral surface and the inner peripheral surface of the cylindrical coupling section 122.

The front sleeve section 123 is a sleeve section for inserting the plug-side ferrule 11 thereto. The front sleeve section 123 is formed at the inside of the outer housing 120, and is formed at the inside of the coupling section 122.

The flange section 124 is a section for fixing the outer housing 120 (and the receptacle-side optical connector 100) to a board (see FIG. 2). Waterproofing packing 125 is disposed between the flange section 124 and the board.

The inner housing 130 is a member to fix the connector main body 110 to the outer housing 120. The inner housing 130 includes a latch section 131 and a fixing section 132. The latch section 131 is a member to retain the connector main body 110. A sleeve section 131A is formed to the latch section 131. The ferrule 111 of the connector main body 110 is inserted into the sleeve section 131A. Namely, the sleeve section 131A and the front sleeve section 123 of the outer housing 120 function as a split sleeve to make the two ferrules 11, 111 abut each other. The fixing section 132 is a member to fix the latch section 131 against the outer housing 120. The fixing section 132 is fixed to the outer housing 120 by screws, preventing the latch section 131 from coming out toward the rear.

The receptacle-side optical connector 100 also includes the cap 160. The cap 160 is a member to protect the coupling section 122 of the receptacle-side optical connector 100 by covering the receptacle-side coupling section 122. The cap 160 is linked to the receptacle-side optical connector 100 (the outer housing 120) by a linking member 161 (see FIG. 1A). A keyway 160A is formed on the inner peripheral surface of the cap 160, and the cap 160 is attached to the cylindrical coupling section 122 while mating the projections 122A of the coupling section 122 with the keyway 160A. As illustrated in FIG. 1A, the keyway 160A is formed in an L-shape, with the cap 160 first inserted parallel to the front-rear direction, and then the cap 160 is rotated to attach the cap 160. In reverse, to remove the cap 160, the cap 160 is rotated and then the cap 160 is pulled out.

A hexagonal hole 160B is formed at the front of the receptacle-side cap 160 (see FIG. 3). A hexagonal wrench section 60A of the plug-side cap 60 (see FIG. 1B) is inserted into the hexagonal hole 160B so as to enable the receptacle-side cap 160 to be attached or detached by rotating the receptacle-side cap 160.

<Plug-Side Optical Connector 10>

Figure 4A:
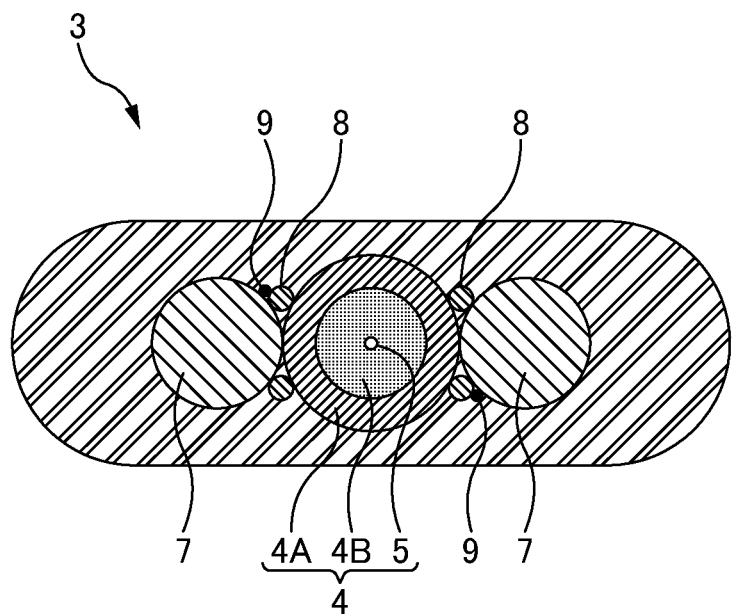
FIG. 4A and FIG. 4B are explanatory diagrams of an optical cable 3 to which the plug-side optical connector 10 is attached according to one or more embodiments.
Figure 4B:
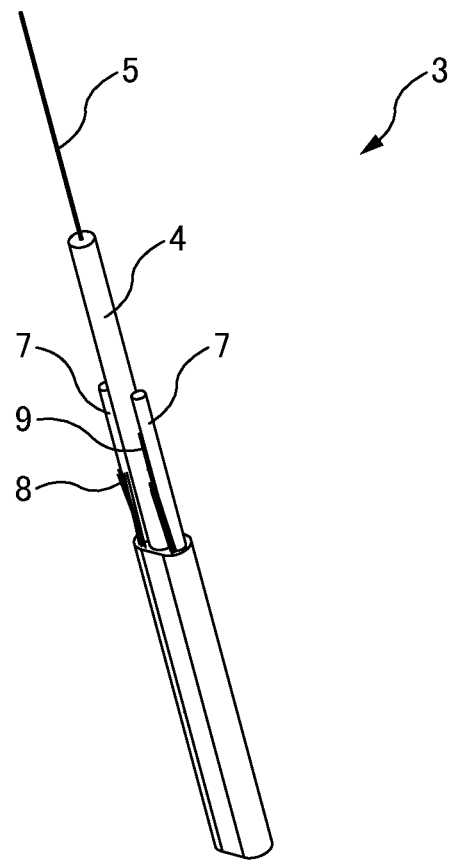

FIG. 4A and FIG. 4B are explanatory diagrams of an optical cable 3 to which the plug-side optical connector 10 is attached. FIG. 4A is a cross-sectional view of the optical cable 3. FIG. 4B is a perspective view of the optical cable 3.

The optical cable 3 includes an optical fiber 5 and the two tensile strength members 7. The optical fiber 5 is accommodated in a cable tube 4 having a gel 4B filled inside a tube 4A. The cable tube 4 in this case accommodates a single optical fiber 5; however, plural optical fibers 5 may be accommodated therein. The two tensile strength members are disposed so as to sandwich the cable tube 4 therebetween. The two tensile strength members 7 are accordingly disposed inside the optical cable 3 so as to sandwich the optical fiber 5. Since the two tensile strength members 7 are disposed so as to sandwich the cable tube 4 therebetween, the optical cable 3 configured with these members covered by an outer covering has a flattened profile in cross-section.

The optical cable 3 also includes waterproofing members 8, and ripcords 9. The waterproofing members 8 are members to absorb any water that has infiltrated into the optical cable 3, and are, for example, configured from an absorbent yarn. The ripcords 9 are string shaped members employed to split open the outer covering of the optical cable 3. The waterproofing members 8 and the ripcords 9 are disposed between the cable tube 4 and the tensile strength members 7. However, there is no limitation to the placement of the waterproofing members 8 and the ripcords 9. The optical cable 3 may also be configured without provision of the waterproofing member 8 and/or the ripcords 9.

Figure 5:
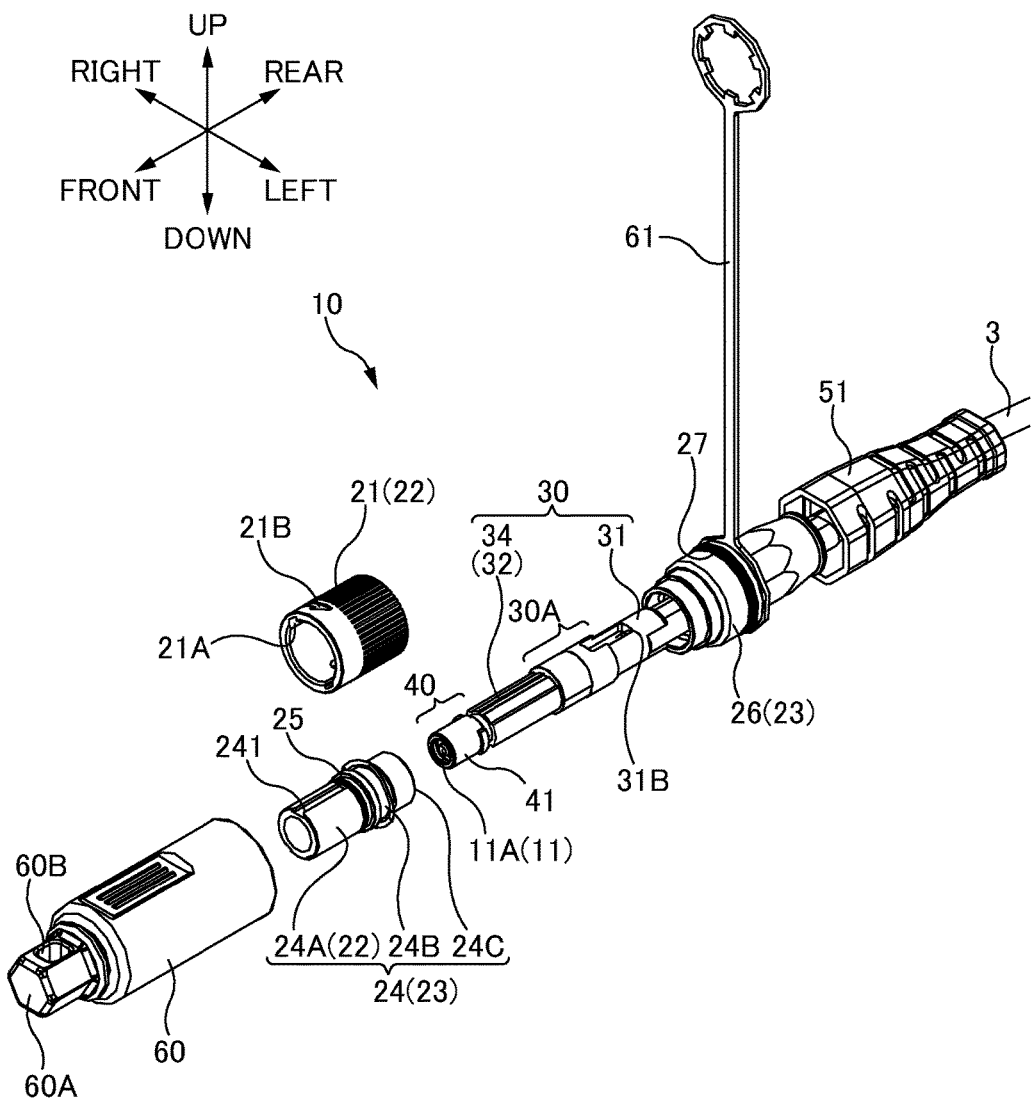
FIG. 5 is an exploded view of the plug-side optical connector 10 according to one or more embodiments.

FIG. 5 is an exploded view of the plug-side optical connector 10. The configuration of the plug-side optical connector 10 will now be described with reference to FIG. 1, FIG. 2, and FIG. 5.

The plug-side optical connector 10 is a connector attached to an end section of the optical cable 3, and is a connector that is attachable to and detachable from the receptacle-side optical connector 100. The optical cable 3 extends from the rear of the plug-side optical connector 10. A boot 51 is attached to the rear of the plug-side optical connector 10 to protect the optical cable 3. Note that the optical cable 3 to which the plug-side optical connector 10 has been attached becomes an optical cable with an optical connector.

The plug-side optical connector 10 also includes the cap 60. The cap 60 is a member that covers the plug-side coupling section 22 to protect the coupling section 22 of the plug-side optical connector 10. The cap 60 is linked to the plug-side optical connector 10 (a rear housing 26 of the outer housing 23) by a linking member 61 (see FIG. 1B). The hexagonal wrench section 60A is formed to the plug-side cap 60, and the hexagonal wrench section 60A is employed to attach or detach the receptacle-side cap 160 by being inserted into the hexagonal hole 160B of the receptacle-side cap 160. A through hole 60B is also formed in the hexagonal wrench section 60A. When it is difficult to remove the cap 60 installed to the plug-side optical connector 10, a rod shaped member which is not shown is inserted through the through hole 60B, and the rod shaped member is used for rotating the cap 60. This makes it easier to remove the cap 60.

The plug-side optical connector 10 includes the ferrule 11, the rotation section 21, the outer housing 23, the inner housing 30, and the imparting mechanism 40.

Ferrule 11

The ferrule 11 is a member to retain an end section of the optical fiber 5. A cylindrical ferrule is employed here to retain the end section of the single core optical fiber. The ferrule 11 includes a ferrule main body 11A and a flange section 11B. The ferrule main body 11A is a cylindrical zirconia section to retain an end section of a single core optical fiber. The flange section 11B is disposed at the rear of the ferrule main body 11A, and is a section (flange section) projecting outward from the outer peripheral surface of the ferrule main body 11A.

Rotation Section 21

The rotation section 21 is a member that couples to the coupling section 122 on the receptacle side, and is a rotatable tube shaped member (coupling section) at the outside of the outer housing 23 (an insertion section 24A). Note that a BNC-type (bayonet-type) coupling mechanism (the coupling section 22) is configured by the rotation section 21 and the insertion section 24A of the outer housing 23. Entry parts 21A and locking parts 21B are formed in the rotation section 21. When the rotation section 21 is connected to the coupling section 122 on the receptacle side, the outer projections 122A on the receptacle side (the projections 122A on the outer peripheral surface of the coupling section 122) pass through the entry parts 21A, and the plug-side rotation section 21 is then rotated to lock (latch) the projections 122a in the locking parts 21B.

Outer Housing 23

The outer housing 23 is a tube shaped member accommodating the inner housing 30. The interior of the tube shaped outer housing 23 is an accommodation section to accommodate the ferrule 11 and the inner housing 30. The outer housing 23 includes a front housing 24 and the rear housing 26. A male screw (the threads of which are not illustrated in FIG. 5) is formed on the outer peripheral surface at a rear end section of the front housing 24, and a female screw on the rear housing 26 connects to the male screw. The rear housing 26 functions as a nut fitting onto the front housing 24.

The front housing 24 is a tube shaped member accommodating a front side of the inner housing 30. The front housing 24 includes the insertion section 24A and a support section 24B.

The insertion section 24A is a section at the front side of the front housing 24, and is a section that is inserted inside the receptacle-side cylindrical coupling section 122. The insertion section 24A, together with the rotation section 21, configures the coupling section 22 of the plug-side optical connector 10.

An end face of the ferrule 11 (and a movable housing 41) is exposed through an opening at the front of the insertion section 24A. A keyway 241 is formed along the front-rear direction on the outer peripheral surface of the insertion section 24A. When being connected to the receptacle-side coupling section 122, the plug-side insertion section 24A is inserted into the receptacle-side cylindrical coupling section 122 while mating the receptacle-side projection 122A (the projection 122A on the inner peripheral surface of the coupling section 122) with the keyway 241. There is a gap between the outer peripheral surface of the insertion section 24A and the inner peripheral surface of the rotation section 21, and the receptacle-side cylindrical coupling section 122 is inserted into this gap.

The support section 24B is a section to support the rotation section 21 so as to be rotatable with respect to the front housing 24. The support section 24B is formed on the outer peripheral surface of a central portion of the front housing 24.

Note that a rear end face 24C of the front housing 24 is a contact section that contacts a front edge of a flange section 30A of the inner housing 30 (a front flange section 32A configured by a first flange section 33E of a first housing 33 and a second flange section 341C of a second housing 34).

The rear housing 26 is a tube shaped member that is attached to the rear of the front housing 24, and that accommodates a rear side of the inner housing 30. The rear housing 26 includes a contact section 26A and an attachment section 26B.

The contact section 26A (see FIG. 2) is a section projecting out from the inner peripheral surface of the tube shaped rear housing 26, and is a section that contacts a rear edge of the flange section 30A of the inner housing 30 (a rear flange section 31E of a fixing housing 31). The flange section 30A of the inner housing 30 is sandwiched from the front and rear between the contact section 26A and the rear end face 24C of the front housing 24. The boot 51 is attached to the attachment section 26B. Note that a shrinkable sleeve 52 (see FIG. 2) is disposed between the attachment section 26B and the boot 51. Filler which is not shown is filled inside the shrinkable sleeve 52, and the shrinkable sleeve 52 blocks up a gap between rear portions of the outer housing 23 and the inner housing 30, and the optical cable 3.

The outer housing 23 further includes a fitting O-ring 25 and a cap O-ring 27.

Figure 6A:
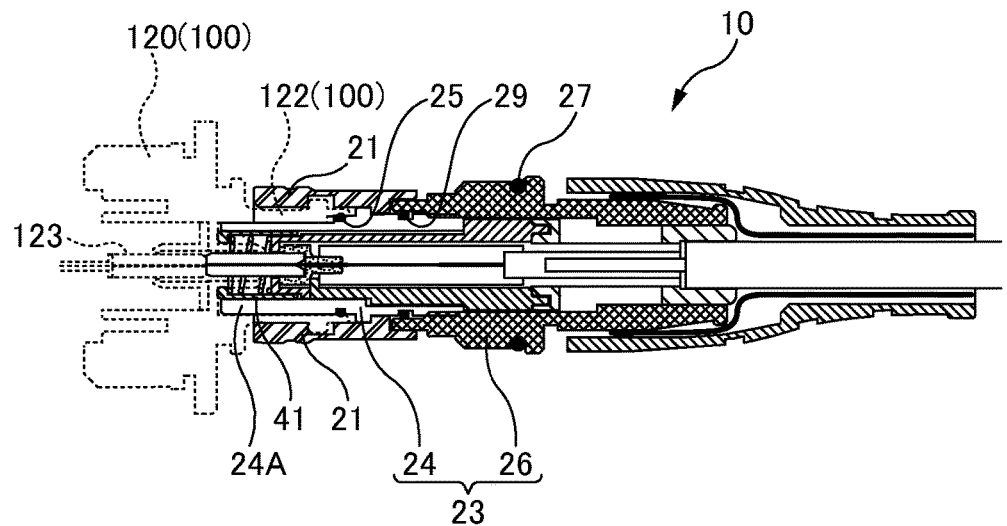
FIG. 6A is an explanatory diagram of placement of a fitting O-ring 25 according to one or more embodiments.

FIG. 6A is an explanatory diagram of placement of the fitting O-ring 25. The fitting O-ring 25 is a waterproofing member to waterproof an optical connection section when the connector is connected. The fitting O-ring 25 is placed on the outer peripheral surface of the insertion section 24A inside the rotation section 21, and contacts the inner peripheral surface of the coupling section 122 of the receptacle-side optical connector 100 when the insertion section 24A has been inserted inside the coupling section 122 of the receptacle-side optical connector 100. This waterproofs between the insertion section 24A that is the plug-side coupling section 22 and the receptacle-side coupling section 122 when the connector is connected, enabling waterproofing of abutting sections (the optical connection sections) of the receptacle-side ferrule 111 and the plug-side ferrule 11.

Note that the keyway 241 is formed on the outer peripheral surface of the insertion section 24A for the projection 122A on the inside of the receptacle-side coupling section 122, whereas the fitting O-ring 25 is placed rearward with respect to the keyway 241. This enables water to be prevented from infiltrating through the keyway 241.

However, suppose that there was a case in which the fitting O-ring 25 was placed on the outer peripheral surface of the cylindrical coupling section 122 of the receptacle-side optical connector 100, it would then be possible to place the fitting O-ring 25 between the plug-side coupling section 22 (in this case, the rotation section 21) and the receptacle-side coupling section 122 when the connector is connected. However, in such cases, the fitting O-ring 25 would contact the rotating rotation section 21, and so there would be a concern that the fitting O-ring 25 would provide lower waterproof performance than that of one or more embodiments. Therefore, in one or more embodiments, by placing the fitting O-ring 25 on the outer peripheral surface of the insertion section 24A, the fitting O-ring 25 is placed between the plug-side insertion section 24A and the receptacle-side cylindrical coupling section 122 when the connector is connected.

Figure 6B:
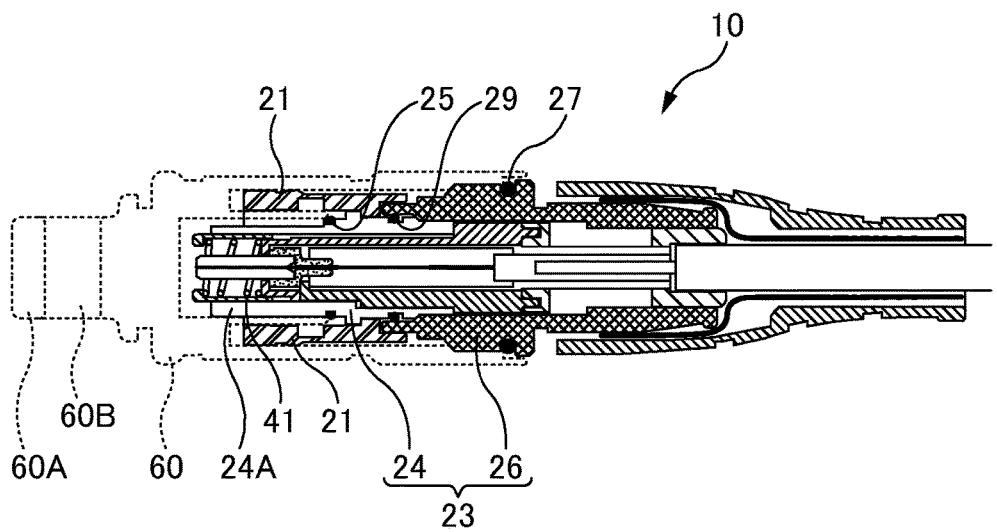
FIG. 6B is an explanatory diagram of placement of a cap O-ring 27 according to one or more embodiments.

FIG. 6B is an explanatory diagram of placement of the cap O-ring 27. The cap O-ring 27 is a waterproofing member to waterproof the optical connection section when the optical connector 10 is capped. The cap O-ring 27 is placed on the outer peripheral surface of the rear housing 26, and contacts the inner peripheral surface of the cap 60 when the cap 60 is put on the plug-side optical connector 10. This enables the inside of the cap 60 to be waterproofed such that the plug-side ferrule 11 is waterproofed when the optical connector 10 is capped.

Note that in one or more embodiments, the fitting O-ring 25 and the cap O-ring 27 are provided separately. Suppose that the fitting O-ring 25 were to be employed so as to double as the cap O-ring 27, due to the cap being inserted into the gap between the rotation section 21 and the insertion section 24A, the rotation section 21 would no longer be protected by a cap. Note that since the cap O-ring 27 is placed rearward with respect to the rotation section 21, it is difficult to employ the cap O-ring 27 so as to double as the fitting O-ring 25. Accordingly, in one or more embodiments, the waterproofing member (the fitting O-ring 25) to waterproof the optical connection section when the connector is connected, and the waterproofing member (the cap O-ring 27) to waterproof the optical connection section when the optical connector 10 is capped, are each separately provided.

Moreover, as illustrated in FIG. 2, the outer housing 23 also includes a housing O-ring 29. The housing O-ring 29 is placed at the connection section between the front housing 24 and the rear housing 26. The housing O-ring 29 is a waterproofing member to waterproof the inside of the outer housing 23.

Inner Housing 30

Figure 7:
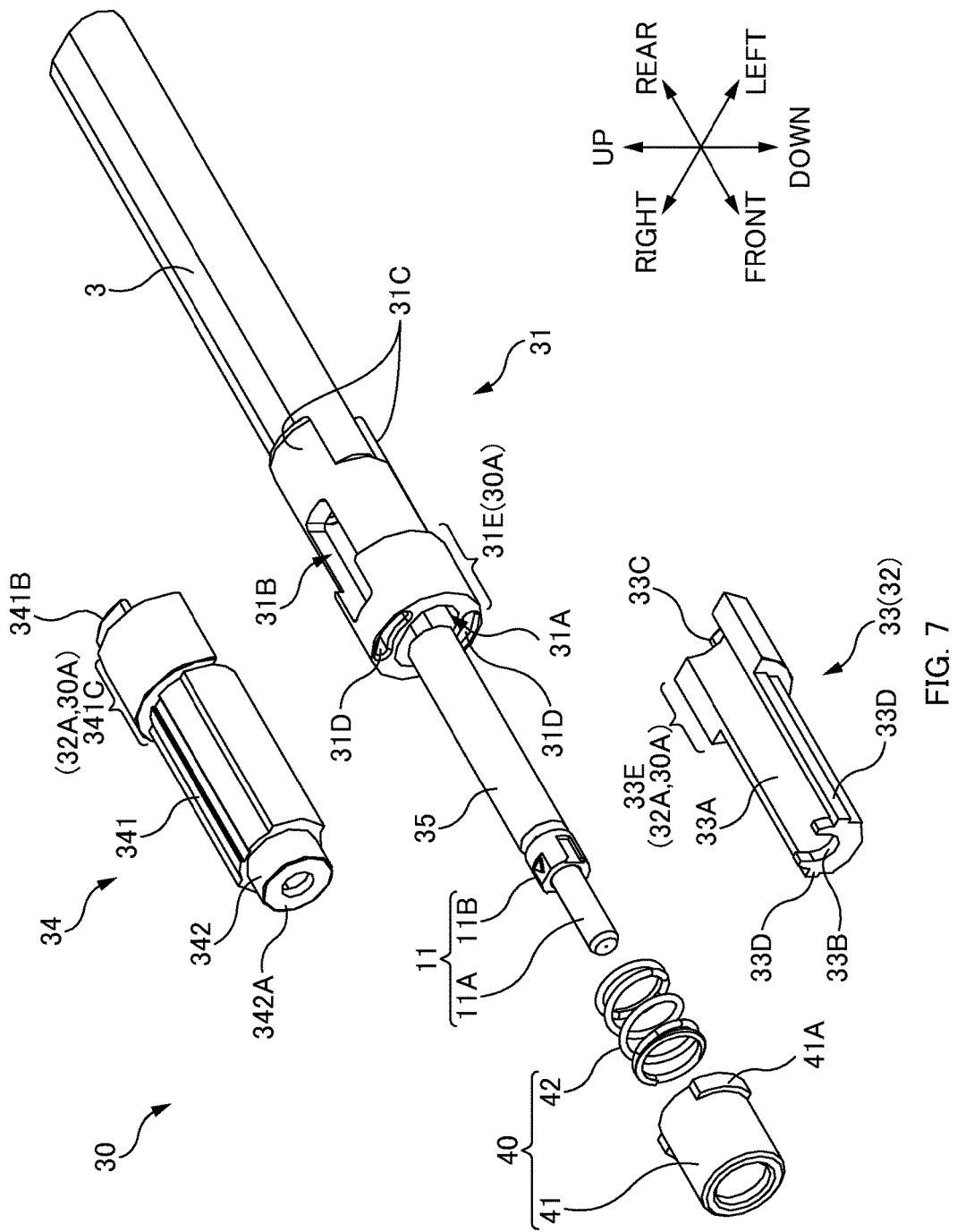
FIG. 7 is an exploded view of an inner housing 30 and an imparting mechanism 40 according to one or more embodiments.

FIG. 7 is an exploded view of the inner housing 30 and the imparting mechanism 40. FIG. 8A to FIG. 8F are explanatory diagrams of states during assembly of the inner housing 30 and the imparting mechanism 40. Note that the operation of assembling the connector 10 may be performed in an assembly plant, or may be performed on site somewhere outside the plant.

Figure 8:
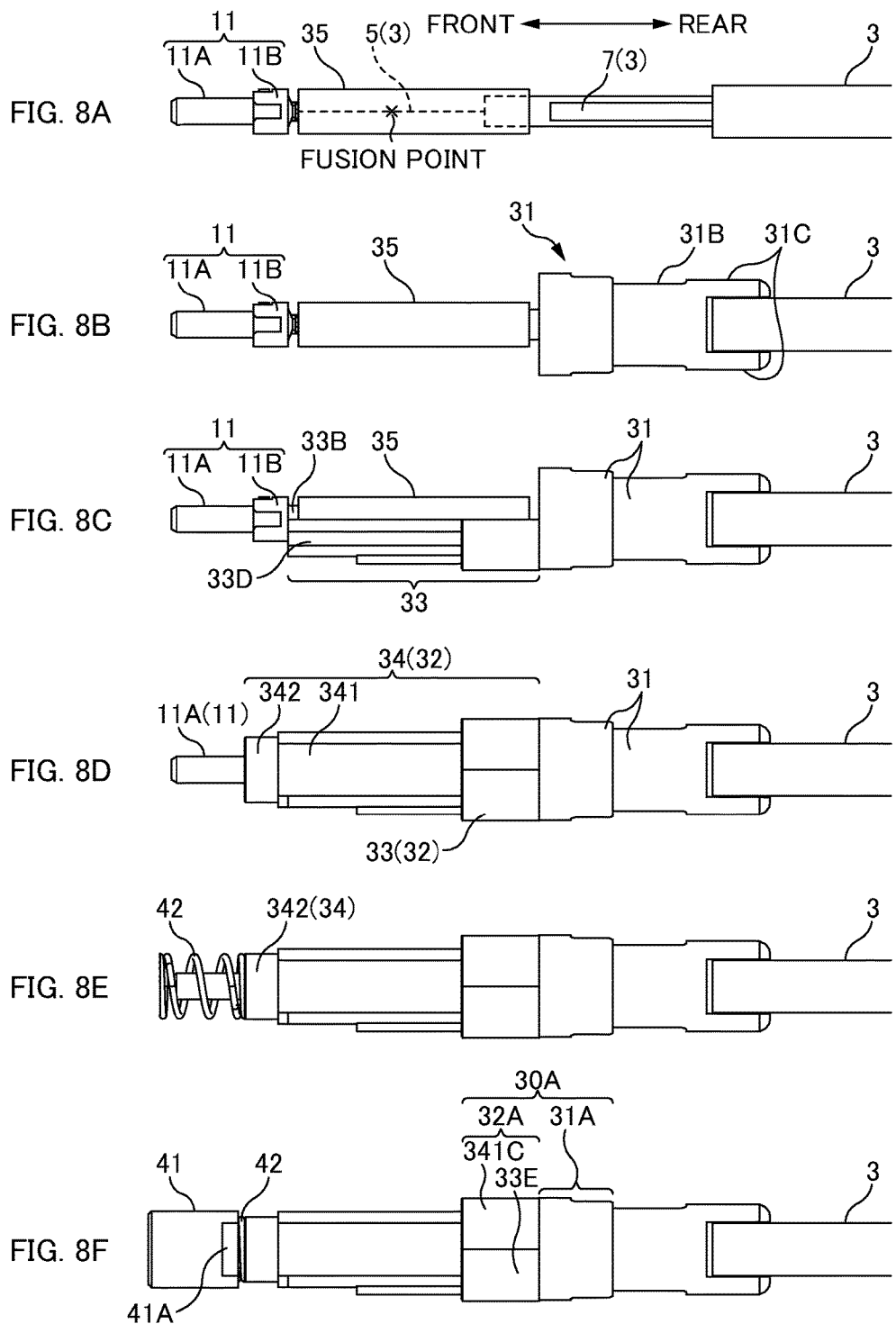
FIG. 8A to FIG. 8F are explanatory diagrams of states during assembly of the inner housing 30 and the imparting mechanism 40 according to one or more embodiments.

The inner housing 30 is a member (a housing) to protect the optical fiber (the naked fiber after stripping a covering) at the rear side of the ferrule 11 inside the outer housing 23. A member to protect the optical fiber 5 (the naked fiber after stripping a covering) at the rear side of the ferrule 11. As illustrated in FIG. 8A, when a pigtail optical fiber attached in advance to the ferrule 11 and the optical fiber 5 protruding from the optical cable 3 have been fused together, a reinforcement tube 35 may be placed on the optical fiber 5 in the vicinity of the fusion point. The inner housing 30 is able to accommodate the reinforcement tube 35. The reinforcement tube 35 is not required in cases in which the optical fiber 5 is not fused (in cases in which the optical fiber 5 protruding from the optical cable 3 is directly connected to the ferrule 11); however, even in such cases, the inner housing 30 capable of accommodating a reinforcement tube 35 may be employed.

The inner housing 30 includes the fixing housing 31 and a central housing 32.

The fixing housing 31 is a member (a housing) to be fixed to the optical cable 3 (more specifically, to the tensile strength members 7) while covering at least a portion of the optical fiber 5 extending from the ferrule 11. The fixing housing 31 is also a member for fixing the central housing (the first housing 33 and the second housing 34) with respect to the optical cable 3. However, the fixing housing 31 and the central housing 32 may be integrated together, and the integrated fixing housing 31 may be fixed to the optical cable 3.

The fixing housing 31 is a tube shaped member into which the optical fiber 5 can be inserted, and includes an insertion hole 31A and an adhesive filling window 31B.

The insertion hole 31A is a hole that allows the optical fiber 5 protruding from the optical cable 3 to be inserted. Inside the insertion hole 31A, the optical fiber 5 and the two tensile strength members 7 of the optical cable 3 are able to be inserted. The tensile strength members 7 may pass through the insertion hole 31A, or may be configured so as not to pass through the insertion hole 31A. In this case the front ends of the tensile strength members 7 are disposed inside the insertion hole 31A without passing through the insertion hole 31A.

The size of the insertion hole 31A is a size enabling the optical fiber 5 and the two tensile strength members 7 to be inserted therein, while being a size that does not allow the whole of the optical cable 3 to be inserted therein. Suppose that the insertion hole 31A were to be of a size allowing the whole of the optical cable 3 to be inserted therein, then the size of the fixing housing 31 would be increased. In contrast thereto, in one or more embodiments, the insertion hole 31A can be made smaller, enabling the fixing housing 31 to be more compact.

However, if the optical cable 3 is no longer able to be inserted into the insertion hole 31A of the fixing housing 31, a limitation will arise during assembly of the optical connector 10 in that the fixing housing 31 is no longer be able to be placed in advance at the rear side of the protruding portion of the optical cable 3. However, in one or more embodiments, the insertion hole 31A is configured to have a size that enables the ferrule 11 to pass through. This enables the fixing housing 31 to be attached by being fitted over from the front side of the ferrule 11 after the optical fiber 5 has been fused (see FIG. 8A and FIG. 8B, described later), and the limitation arising from the optical cable 3 not being able to be inserted into the insertion hole 31A of the fixing housing 31 during assembly is a permissible limitation.

The adhesive filling window 31B is a window (opening) to communicate the insertion hole 31A with the outside. The tensile strength members 7 of the optical cable 3 and the fixing housing 31 are bonded and fixed together by filling adhesive into the insertion hole 31A through the adhesive filling window 313. The housing attachment operation becomes simple due to being able to fix with adhesive and not through joining by crimping a metal member. Moreover, the operation of applying the adhesive between the tensile strength members 7 and the inner wall of the fixing housing 31 is facilitated by filling the adhesive through the adhesive filling window 31B. The operation of applying the adhesive is also facilitated by being able to confirm the conditions of applying the adhesive inside the fixing housing 31 through the adhesive filling window 31B.

Figure 9:
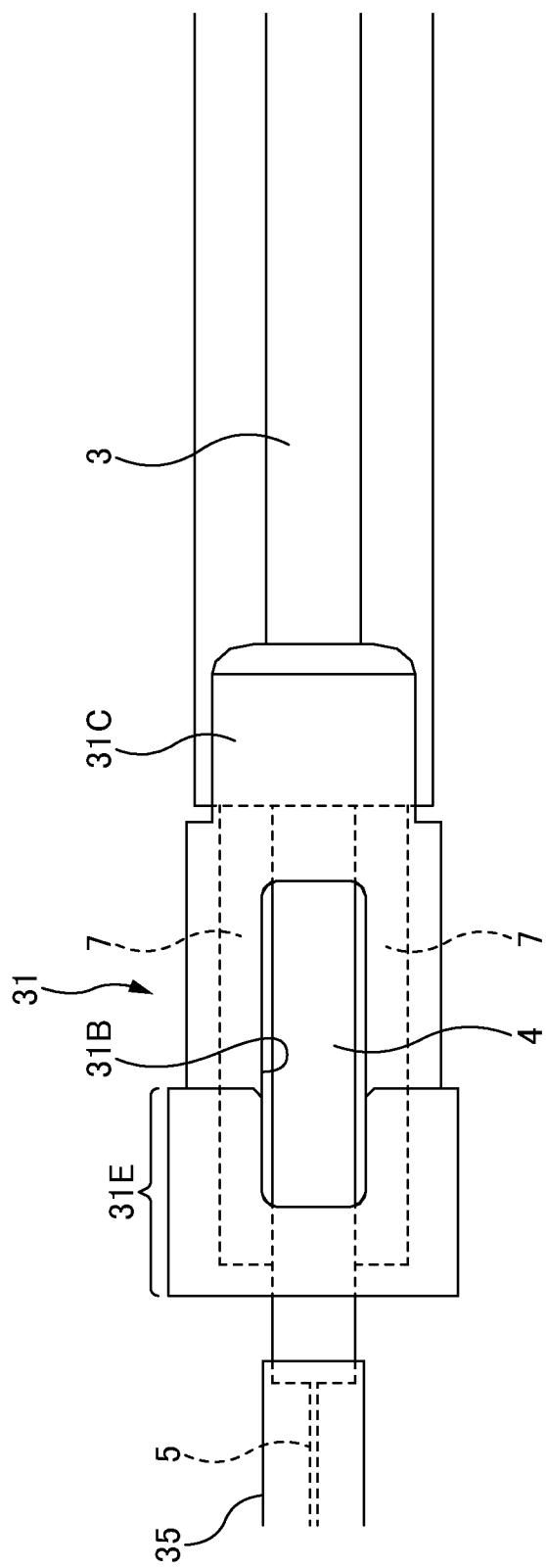
FIG. 9 is a diagram illustrating a fixing housing 31 during bonding when viewed from above according to one or more embodiments.

FIG. 9 is a diagram illustrating the fixing housing 31 during bonding, as viewed from above.

The adhesive filling window 31B is formed in the fixing housing 31 so as to open along the up-down direction. Namely, the adhesive filling window 31B is formed in the fixing housing 31 so as to open along a direction (the up-down direction) perpendicular to the arrangement direction of the two tensile strength members 7 (the left-right direction) and to the longitudinal direction of the optical cable 3 (the front-rear direction). This facilitates the operation of applying the adhesive onto the two tensile strength members 7.

Moreover, the adhesive filling window 31B has a shape elongated along the front-rear direction (the longitudinal direction of the optical cable 3). This enables adhesive to be applied along the front-rear direction of the tensile strength members 7 inside the fixing housing 31, lengthens a region applied by the adhesive between the tensile strength members 7 and the inner wall of the fixing housing 31, and achieves strong bonding and fixing between the two counterparts.

Moreover, the width of the adhesive filling window 31B in the left-right direction is wider than the width of the optical fiber 5 (the diameter of the optical fiber 5 including the covering). This enables the two tensile strength members 7 sandwiching the optical fiber 5 to be seen through the adhesive filling window 31B, thereby facilitating the operation of applying the adhesive on the tensile strength members 7.

Projections 31C are formed projecting out toward the rear at the top and at the bottom of a rear end section of the fixing housing 31. The upper and lower projections 31C grip the outer covering of the optical cable 3 from above and below. Namely, the upper and lower projections 31C grip the flat optical cable 3 along its minor axis direction. Positional misalignment of the fixing housing 31 with respect to the optical cable 3 prior to bonding (positional misalignment in a rotation direction in particular) can thereby be suppressed, facilitating the operation of filling adhesive through the adhesive filling window 31B.

Engagement holes 31D are formed at the top and at the bottom of a front end section of the fixing housing 31. Engagement tabs (a first engagement tab 33C and a second engagement tab 341B) formed at the rear end section of the central housing 32 (the first housing 33 and the second housing 34) engage with the engagement holes 31D. This enables positional misalignment of the central housing 32 (the first housing 33 and the second housing 34) with respect to the fixing housing 31 to be suppressed.

A rear flange section 31E is formed at the front side of the fixing housing 31. The rear flange section 31E, together with the front flange section 32A of the central housing 32, configures the flange section 30A of the inner housing 30. The rear flange section 31E contacts the contact section 26A of the rear housing 26 configuring the outer housing 23.

After the optical fiber 5 has been fused and the reinforcement tube 35 is placed at the fusion point as illustrated in FIG. 8A, the fixing housing 31 is then inserted over from the front side of the ferrule 11, and attached to the protruding portion of the optical cable 3, as illustrated in FIG. 8B. Since the fixing housing 31 is able to be inserted over from the front side of the ferrule 11 so as to be attached after the optical fiber 5 has been fused, the optical fiber 5 protruding from the optical cable 3 can be set in a fusion device even if this optical fiber 5 is short. This enables the optical connector 10 to be more compact than cases in which the fixing housing 31 needs to be placed in advance at the rear of the ferrule 11 prior to fusing.

Note that, before the fixing housing 31 is attached to the optical cable 3, the members (the rear housing 26, the shrinkable sleeve 52 and the boot 51) placed rearward from the fixing housing 31 are inserted over and placed rearward from the protruding portion of the optical cable 3. The operation of inserting these members over the optical cable 3 may be performed prior to fusing the optical fiber 5, or may be performed after the optical fiber 5 has been fused.

Figure 10:
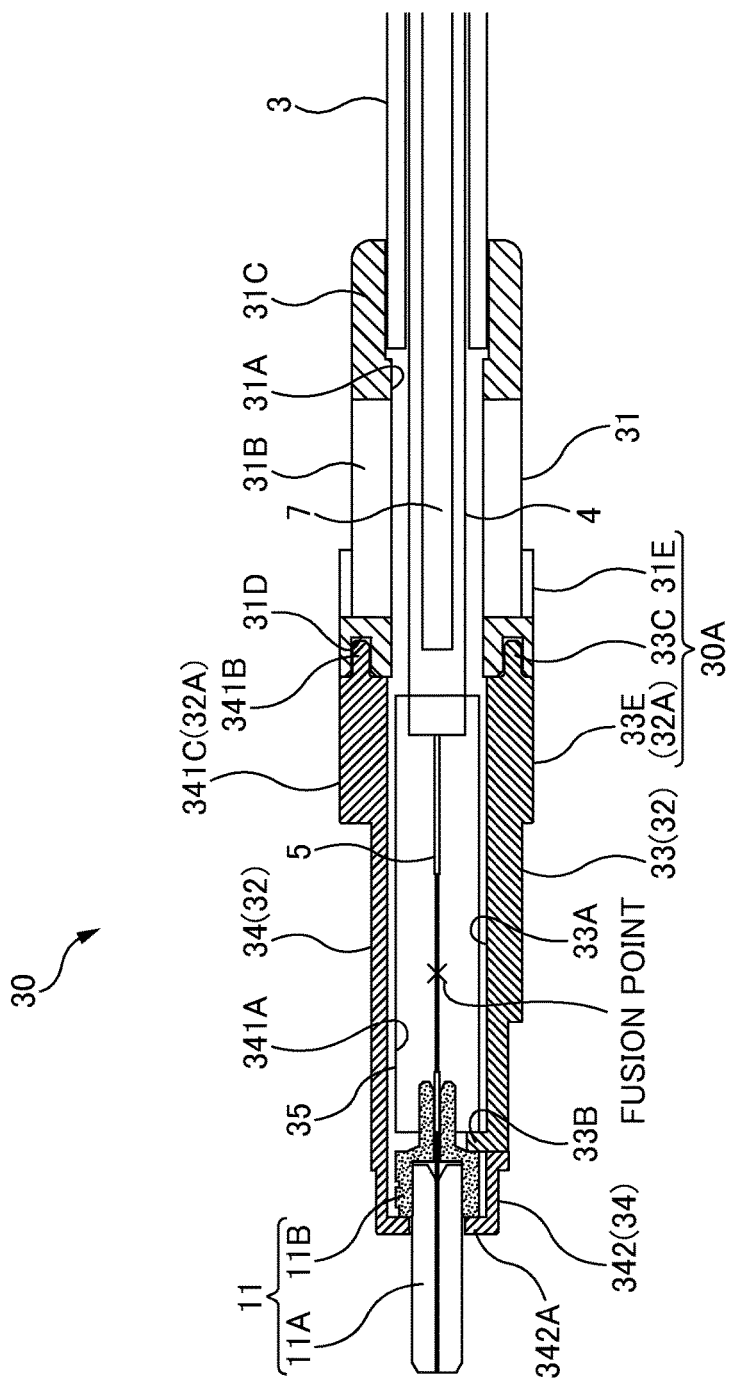
FIG. 10 is a cross-sectional view of the inner housing 30 according to one or more embodiments.

FIG. 10 is a cross-sectional view of the inner housing 30.

The central housing 32 is a member to protect the optical fiber 5 (the naked fiber after stripping a covering) at the rear side of the ferrule 11, and is a member (a housing) capable of accommodating the reinforcement tube 35. The central housing 32 is positioned at a central portion of the inner housing 30, and is positioned at the front side of the fixing housing 31.

The front flange section 32A is formed at the rear side of the central housing 32. The front flange section 32A, together with the rear flange section 31E of the fixing housing 31, configures the flange section 30A of the inner housing 30. The front flange section 32A contacts the rear end face 24C of the front housing 24 configuring the outer housing 23. Note that the flange section 30A of the inner housing 30 (the front flange section 32A and the rear flange section 31E) are sandwiched from the front and rear between the rear end face 24C of the front housing 24 and the contact section 26A of the rear housing 26. The inner housing 30 (the fixing housing 31 and the central housing 32) is thereby fixed with respect to the outer housing 23.

The central housing 32 includes the first housing 33 and the second housing 34. The central housing 32 may be configured by a cylindrical single-body structure; however, in one or more embodiments, the central housing 32 is divided into the first housing 33 and the second housing 34 which each serve as a substantially halved structure. This enables the flange section 11B of the ferrule 11 to be pressed from both the front and rear sides, fixing the position of the ferrule 11 in the front-rear direction, as illustrated in FIG. 10.

The first housing 33 is a half-cylinder shaped member covering a lower section of the reinforcement tube 35. The first housing 33 includes a first accommodation section 33A, a rear edge pressing section 33B, a first engagement tab 33C, guide sections 33D, and a first flange section 33E.

The first accommodation section 33A is a section to accommodate a lower section of the reinforcement tube 35. The first accommodation section 33A is formed with a concave shape extending along the front-rear direction.

The rear edge pressing section 33B is a section to press the rear edge of the flange section 11B of the ferrule 11 from the rear side (the opposite side to the receptacle-side optical connector 100 side). The rear edge pressing section 33B is a section formed in a U-shape. As illustrated in FIG. 8C and FIG. 10, the U-shaped rear edge pressing section 33B is inserted so as to be interposed between the flange section 11B of the ferrule 11 and the reinforcement tube 35. The front face of the rear edge pressing section 33B contacts the rear edge of the flange section 11B of the ferrule 11, and is able to prevent the ferrule 11 from moving toward the rear. This enables the ferrule 11 to be prevented from moving rearward when the ferrule 11 abuts the ferrule 111 of the receptacle-side optical connector 100 (when the connector is connected). Moreover, since space for enabling the ferrule 11 to be retracted is not needed, the optical connector 10 can be made compact.

The first engagement tab 33C is a section that projects rearwards (toward the fixing housing 31 side) from the rear end of the first housing 33, and is a section that engages with the engagement hole 31D of the fixing housing 31. By engaging the first engagement tab 33C with the engagement hole 31D of the fixing housing 31, positional misalignment of the first housing 33 with respect to the fixing housing 31 can be suppressed, and the first housing 33 can be prevented from coming out of the fixing housing 31.

The guide sections 33D are sections to guide the second housing 34 along the front-rear direction. The guide sections 33D are formed as projecting ridges running along the front-rear direction on the outer peripheral surface of the half-cylinder shaped first housing 33. Note that guide grooves (not illustrated in the drawings) are formed running along the front-rear direction on the inner peripheral surface of the second housing 34 so as to mate with the guide sections 33D of the first housing 33.

The first flange section 33E is a section configuring the front flange section 32A of the central housing 32. The first flange section 33E is a section projecting outwards from the outer peripheral surface of the half-cylinder shaped first housing 33, and is formed at the rear side of the first housing 33.

As illustrated in FIG. 8C and FIG. 10, after the fixing housing 31 has been attached to the optical cable 3 (see FIG. 8C), the first housing 33 is placed so as to cover a lower section of the reinforcement tube 35 by interposing the U-shaped rear edge pressing section 33B between the flange section 11B of the ferrule 11 and the reinforcement tube 35 while engaging the first engagement tab 33C with the engagement hole 31D of the fixing housing 31.

The second housing 34 is a member that covers an upper section of the reinforcement tube 35. The second housing 34 includes a half-cylinder section 341 and a cylinder section 342.

The half-cylinder section 341 is a half-cylinder shaped section positioned rearward from the cylinder section 342, and includes a second accommodation section 341A (see FIG. 10) for accommodating an upper section of the reinforcement tube 35. The second accommodation section 341A is formed in a concave shape extending along the front-rear direction. At a rear end section of the half-cylinder section 341, a second engagement tab 341B projecting rearward (toward the fixing housing 31 side) is formed. The second engagement tab 341B is a section that engages with the engagement hole 31D of the fixing housing 31. The half-cylinder section 341 covers the outside of a part of the half-cylinder shaped first housing 33. Guide grooves (not illustrated in the drawings) are formed extending along the front-rear direction on the inner peripheral surface of the half-cylinder section 341 covering the first housing 33 so as to mate with the guide sections 33D of the first housing 33. Moreover, the second flange section 341C is formed at the rear side of the half-cylinder section 341. The second flange section 341C is a section that, together with the first flange section 33E, configures the front flange section 32A of the central housing 32, and is a section projecting outwards from the outer peripheral surface of the half-cylinder section 341.

The cylinder section 342 is a section at the front side of the half-cylinder section 341, and is a cylindrical section covering the flange section 11B of the ferrule 11. A pressing section 342A is formed to a front edge of the cylinder section 342. As illustrated in FIG. 10, the rear face (inner face) of the pressing section 342A contacts the front edge of the flange section 11B of the ferrule 11, enabling the ferrule 11 to be suppressed from moving forward. Namely, the flange section 11B of the ferrule 11 is pressed from both the front and rear sides by the rear edge pressing section 33B of the first housing 33 and the pressing section 342A of the second housing 34. The position of the ferrule 11 is thereby fixed in the front-rear direction. A hole is open at a central portion of the pressing section 342A, and the ferrule main body 11A projects out through this hole. The front face of the pressing section 342A and the rear end of a spring 42 which is described later contact each other.

After the first housing 33 is attached (see FIG. 8C), the second housing 34 is attached at the position indicated in FIG. 8D by sliding the second housing 34 rearward with respect to the first housing 33 while mating the guide grooves (not illustrated in the drawings) on the inside of the second housing 34 with the guide sections 33D of the first housing 33. When this is performed, movement of the second housing 34 in the up-down direction and the left-right direction with respect to the first housing 33 is restricted due to the guide sections 33D of the first housing 33 being inserted into the guide grooves of the second housing 34. This makes misalignment of the second housing 34 with respect to the first housing 33 not liable to occur, and facilitates an operation of attaching the second housing 34.

When the second housing 34 has been slid rearward, as illustrated in FIG. 10, the second engagement tab 341B engages with the engagement hole 31D of the fixing housing 31. This enables positional misalignment of the second housing 34 with respect to the fixing housing 31 to be suppressed.

Moreover, when the second housing 34 has been slid rearward, as illustrated in FIG. 10, the ferrule main body 11A projects out through the hole in the central portion of the pressing section 342A of the cylinder section 342, and the flange section 11B of the ferrule 11 is accommodated inside the cylinder section 342. In this state, the pressing section 342A of the second housing 34 sandwiches the flange section 11B of the ferrule 11 against the rear edge pressing section 33B of the first housing 33. The flange section 11B of the ferrule 11 is thereby pressed from both the front and rear sides, fixing the position of the ferrule 11 in the front-rear direction.

As illustrated in FIG. 8D, the central housing 32 is configured at the front side of the fixing housing 31 by attaching the second housing 34. Moreover, when the second housing 34 is attached, the front flange section 32A is configured by the second flange section 341C and the first flange section 33E of the first housing 33. The flange section 30A (the flange section 30A to be gripped by the outer housing 23) of the inner housing 30 is configured by the front flange section 32A and the rear flange section 31E of the fixing housing 31.

Imparting Mechanism 40

The imparting mechanism 40 is a mechanism to impart a rearward-directed force to the plug-side optical connector 10 when the connector is connected. The imparting mechanism 40 includes the movable housing 41 and the spring 42.

The movable housing 41 is a member (housing) accommodating the ferrule main body 11A while being able to move in the front-rear direction. The movable housing 41 functions as a housing covering the ferrule main body 11A, and the ferrule main body 11A is protected thereby. The movable housing 41 has a cylindrical shape, the ferrule main body 11A is inserted into a central portion of the movable housing 41, and the spring 42 is accommodated in the hollow center of the movable housing 41. The movable housing 41 is placed forward with respect to the central housing 32, and the spring 42 is interposed between the movable housing 41 and the central housing 32.

The spring 42 (see FIG. 7) is an elastic member imparting a rearward-directed force to the plug-side optical connector 10 when the connector is connected. A coil spring is employed here as the spring 42; however, a spring having a different shape may be employed, or an elastic member of a different substance, such as rubber, may be employed. The ferrule main body 11A is inserted into the hollow center of the spring 42. The spring 42 is interposed in a compressed state between the movable housing 41 and the inner housing 30 (the pressing section 342A of the second housing 34), and generates repulsion force between the two housings. The front end of the spring 42 contacts the inner wall of the movable housing 41, and the rear end of the spring 42 contacts the front face of the pressing section 342A of the second housing 34.

Note that, after the second housing 34 is attached (see FIG. 8D), the spring 42 is then attached to the ferrule main body 11A projecting forward from the second housing 34, as illustrated in FIG. 8E.

The front side of the movable housing 41 is open, and an end face of the ferrule 11 is exposed through this opening (see FIG. 1B and FIG. 2). There is a gap between the movable housing 41 and the ferrule 11. When the connector is connected, the plug-side ferrule 11 is inserted into the front sleeve section 123 (see FIG. 2) on the receptacle side, and the receptacle-side front sleeve section 123 is inserted into the gap between the movable housing 41 and the ferrule 11.

The movable housing 41 is exposed through the opening at the front side of the insertion section 24A, and is placed projecting just slightly forwards of the front edge of the insertion section 24A (see FIG. 2). The movable housing 41 projects forward of the insertion section 24A, and thus when the connector is connected, the movable housing 41 contacts the receptacle-side optical connector 100 (more specifically, the base of the front sleeve section 123 of the outer housing 120), and receives a force from the receptacle side. As a result, the repulsion force of the compressed spring 42 acts between the receptacle-side optical connector 100 and the plug-side optical connector 10 through the central housing 32, and consequently strengthening coupling (latching) between the receptacle-side coupling section 122 (the projections 122A) and the plug-side coupling section 22 (the locking parts 21B of the rotation section 21), thereby making it more difficult for the receptacle-side coupling section 122 and the plug-side coupling section 22 to be released.

A flange section 41A is formed to the movable housing 41. The flange section 41A contacts a projecting portion (not illustrated in the drawings) formed on the inner peripheral surface of the front housing 24, thereby determining the foremost position of the movable housing 41 with respect to the front housing 24. The movable housing 41 that has been imparted with forward-directed force by the spring 42 is thereby prevented from coming out from the front, while allowing rearward movement of the movable housing 41 when the connector is connected.

After the spring 42 is attached to the ferrule main body 11A (see FIG. 8E), the movable housing 41 is attached from the front side so as to accommodate the spring 42, as illustrated in FIG. 8F. The front housing 24 with the rotation section 21 attached is then inserted from the front side of the inner housing 30, and the front housing 24 and the rear housing 26 that has been inserted over the optical cable 3 in advance are fitted together (retained with screws) and connected. At this time, the flange section 30A of the inner housing 30 is sandwiched from the front and rear between the contact section 26A of the rear housing 26 and the rear end face 24C of the front housing 24. When the front housing 24 is connected to the rear housing 26, the flange section 41A of the movable housing 41 contacts projecting portions (not illustrated in the drawings) formed on the inner peripheral surface of the front housing 24, and the spring 42 is interposed in a compressed state between the movable housing 41 and the inner housing 30 (the pressing section 342A of the second housing 34).

The repulsion force of the spring 42, incidentally, has a function to make coupling (latching) between the receptacle-side coupling section 122 (the projections 122A) and the plug-side coupling section 22 (the locking parts 21B of the rotation section 21) more difficult to be released. The spring 42 possessing such a function is placed at the front side of the housing section 11B of the ferrule 11, enabling the spring 42 to be inserted and attached from the front side of the ferrule 11 after the optical fiber 5 has been fused. Suppose that there were to be a configuration in which a spring was placed at the rear side of the housing section 11B of the ferrule 11, the spring would then need to be placed in advance at the rear of the ferrule 11 prior to fusing. Thus, in comparison to such a case, the optical fiber 5 protruding from the optical cable 3 can be set in a fusion device even if the optical fiber 5 is short, enabling the plug-side optical connector 10 to be more compact.

Moreover, suppose that there were to be a configuration in which a spring was placed at the rear side of the housing section 11B of the ferrule 11, a space would then need to be provided to enable the ferrule 11 to escape (retract) rearward when the connector is connected. To address this issue, in one or more embodiments, since the spring 42 is placed at the front side of the housing section 11B of the ferrule 11, the ferrule 11 does not move in the front-rear direction, and a space for allowing the ferrule 11 to be retracted does not need to be provided, thereby enabling the plug-side optical connector 10 to be more compact.

<Summary (1)>

The plug-side optical connector 10 described above includes the insertion section 24A to be inserted inside the cylindrical coupling section 122 of the receptacle-side optical connector 100, and includes the rotation section 21 that is coupled to the coupling section 122 of the receptacle-side optical connector 100 and that is rotatable at the outside of the insertion section 24A. Incases in which the plug-side optical connector 10 includes such a rotation section 21, if the fitting O-ring 25 (waterproofing member) is placed so as to contact the rotation section 21, waterproof performance may be low when the connector is connected.

Hence, in one or more embodiments, the fitting O-ring 25 (waterproofing member) is placed on the outer peripheral surface of the insertion section 24A inside the rotation section 21 such that the fitting O-ring 25 contacts the inner peripheral surface of the coupling section 122 when the insertion section 24A is inserted inside the coupling section 122 of the receptacle-side optical connector 100. This enables high waterproof performance to be achieved without being affected by rotation of the rotation section 21.

In one or more embodiments, the insertion section 24A is formed on the outer housing 23 (housing), and the cap O-ring 27 (another waterproofing member) that is different from the fitting O-ring 25 is placed so as to contact the inner peripheral surface of the cap 60 when the cap 60 is mounted to cover the insertion section 24A and the rotation section 21. In one or more embodiments, due to provision of the cap O-ring 27 separate from the fitting O-ring 25 in this manner, both waterproofing of the optical connection section and protection of the coupling section 22 can be achieved when capped. Note that suppose that the fitting O-ring 25 were to be employed so as to also double as the cap O-ring 27, the rotation section 21 would then no longer be able to be protected by a cap.

In one or more embodiments, the outer housing 23 is configured from the front housing 24 and the rear housing 26, and the housing O-ring 29 (yet another waterproofing member) is placed at the connection section between the front housing 24 and the rear housing 26. The connection section between the front housing 24 and the rear housing 26 is thereby waterproofed, enabling the inside of the outer housing 23 to be waterproofed.

In one or more embodiments, the projections 122A are formed at the inside of the cylindrical coupling section 122 of the receptacle-side optical connector 100, and the keyway 241 for the projections 122A is formed on the outer peripheral surface of the insertion section 24A of the plug-side optical connector 10. The fitting O-ring 25 (waterproofing member) is then placed on the rear side of the keyway 241 (on the opposite side to the receptacle-side optical connector 100 side as viewed from the keyway 241). Water can thereby be prevented from infiltrating through the keyway 241.

Note that although the plug-side optical connector 10 of one or more embodiments includes the cap O-ring 27 and the housing O-ring 29 as other waterproofing members different from the fitting O-ring 25, the cap O-ring 27 and the housing O-ring 29 do not necessarily have to be provided. Even in such cases, high waterproof performance can be achieved, without being affected by rotation of the rotation section 21, by placing the fitting O-ring 25 (waterproofing member) on the outer peripheral surface of the insertion section 24A inside the rotation section 21.

Moreover, a configuration is adopted in the plug-side optical connector 10 of one or more embodiments such that the ferrule 11 is not retractable due to the presence of the rear edge pressing section 33B of the inner housing 30, and the spring 42 is placed forward from the flange section 11B of the ferrule 11. However, if the fitting O-ring 25 (the waterproofing member) is placed on the outer peripheral surface of the insertion section 24A at the inside of the rotation section 21, a configuration may be adopted in which a spring is placed rearward from the flange section 11B of the ferrule 11 and the ferrule 11 is retractable.

<Summary (2)>

The plug-side optical connector 10 described above includes the plug-side coupling section 22 (the rotation section 21 and the insertion section 24A) to be coupled to the coupling section 122 of the receptacle-side optical connector 100, the ferrule 11 with the flange section 11B, the inner housing 30 (the fixing housing 31 and the central housing 32) covering at least a portion of the optical fiber extending from the ferrule 11, and the spring 42 (an elastic member). In one or more embodiments, the spring 42 is placed forward from the flange section 11B of the ferrule 11, and thus during assembly of the optical connector 10, the spring 42 does not need to be inserted in advance over the optical fiber 5 before the ferrule 11 is attached. As a result, not only does the operation of assembling the optical connector become simple, but the optical fiber 5 protruding from the optical cable 3 can be set in a fusion device even if the optical fiber 5 is short, enabling the plug-side optical connector 10 to be more compact.

The coupling section 22 (the rotation section 21 and the insertion section 24A) of the plug-side optical connector 10 described above is configured with a bayonet-type coupling mechanism. Thus, the repulsion force of the spring 42 when the connector is connected enables the coupling (latching) between the receptacle-side coupling section 122 (the projections 122A) and the plug-side coupling section 22 (the locking parts 21B of the rotation section 21) to be made difficult to be released.

Incidentally, coupling between the coupling sections 22, 122 could conceivably be made difficult to be released when the connector is connected by using pressing force of the receptacle-side ferrule 111 on the plug-side ferrule 11. However, since the ferrule 11 is fitted to the front sleeve section 123 (the split sleeve) when the connector is connected, the pressing force of the receptacle-side ferrule 111 on the plug-side ferrule 11 is absorbed by the front sleeve section 123. Thus, the pressing force of the receptacle-side ferrule 111 on the plug-side ferrule 11 alone is insufficient to make coupling of the coupling sections 22, 122 difficult to be released. To address this issue, in one or more embodiments, even though the ferrule 11 is inserted into the front sleeve section 123 (the split sleeve) of the receptacle-side optical connector 100 when the connector is connected, due to the repulsion force generated by the plug-side spring 42 being compressed and deformed when the connector is connected, the coupling (latching) between the receptacle-side coupling section 122 (the projections 122A) and the plug-side coupling section 22 (the locking parts 21B of the rotation section 21) can be made difficult to be released by utilizing this repulsion force of the spring 42. Thus, placing the spring 42 forward from the flange section 11B of the ferrule 11 is particularly advantageous in situations in which the ferrule 11 is inserted into a split sleeve when the connector is connected.

As illustrated in FIG. 8A and FIG. 8E, in the plug-side optical connector 10 described above, the spring can be attached at the front side of the inner housing 30 (the central housing 32) after the optical fiber 5 is fused. Thus, since the optical fiber 5 does not need to be inserted in advance into the spring 42 prior to fusing, not only does the operation of assembling the optical connector become simple, but the optical fiber 5 protruding from the optical cable 3 can be set in a fusion device even if the optical fiber 5 is short, enabling the plug-side optical connector 10 to be more compact.

Moreover, as illustrated in FIG. 8A and FIG. 8B, in the plug-side optical connector 10 described above, the inner housing 30 (the fixing housing 31) can be attached to the protruding portion of the optical cable 3 after the optical fiber 5 is fused. Thus since the optical fiber 5 does not need to be inserted in advance into the fixing housing 31 prior to fusing, not only does the operation of assembling the optical connector become simple, but the optical fiber 5 protruding from the optical cable 3 can be set in a fusion device even if the optical fiber 5 is short, enabling the plug-side optical connector 10 to be more compact.

The size of the insertion hole 31A described above is a size enabling the optical fiber 5 and the two tensile strength members 7 to be inserted therein, while being a size that does not allow the whole of the optical cable 3 to be inserted therein. When it is not possible to insert the optical cable 3 into the insertion hole 31A of the fixing housing 31 in this manner, then a limitation arises in that it is no longer possible to place the fixing housing 31 in advance rearward from the protruding portion of the optical cable 3 during assembly of the optical connector 10. To address this issue, the insertion hole 31A described above is configured to have a size that enables the ferrule 11 to pass through. This enables the fixing housing 31 to be attached by being inserted over from the front side of the ferrule 11 after the optical fiber 5 has been fused (see FIG. 8A and FIG. 8B), and the limitation during assembly is permissible.

In the plug-side optical connector 10 described above, the movable housing 41 (another housing) covering the ferrule main body 11A of the ferrule 11 is provided at the front side (the receptacle-side optical connector 100 side) of the spring 42. The ferrule main body 11A is thereby protected by the movable housing 41, and the spring 42 can be suppressed from making direct contact with the receptacle-side optical connector 100. However, the movable housing 41 may be omitted when the rear end of the spring 42 can be fixed to the housing.

As illustrated in FIG. 10, the inner housing 30 described above includes the rear edge pressing section 33B (pressing section) to press the flange section 11B of the ferrule 11 from the rear side (the opposite side to the receptacle-side optical connector 100 side). Thus the ferrule 11 can be suppressed from moving rearward when the ferrule 11 and the receptacle-side ferrule 111 abut each other (when the connector is connected). Moreover, since space for allowing the ferrule 11 to be retracted is not needed, the optical connector 10 can be more compact.

<Summary (3)>

The plug-side optical connector 10 described above is an optical connector that is attached to an end section of the optical cable 3 including the optical fiber 5 and the tensile strength members 7. The plug-side optical connector 10 includes the ferrule 11 that retains an end section of the optical fiber 5, and the fixing housing 31 that covers at least a part of the optical fiber extending from the ferrule 11 and is fixed to the optical cable 3. The fixing housing 31 includes the insertion hole 31A having an internal capacity that enables the optical fiber 5 and the tensile strength members 7 to be placed therein, and the adhesive filling window 31B enabling adhesive to be filled inside the insertion hole 31A. Accordingly, the operation of attaching the housing becomes simple due to the fixation with an adhesive instead of joining by crimping a metal member. Moreover, since the adhesive is filled through the adhesive filling window 31B, the operation of applying the adhesive between the tensile strength members 7 and the inner wall of the fixing housing 31 is facilitated.

As illustrated in FIG. 9, the adhesive filling window 31B described above is formed in the fixing housing 31 so as to open in a direction (the up-down direction) perpendicular to the arrangement direction of the two tensile strength members 7 (the left-right direction) and the longitudinal direction (the front-rear direction) of the optical cable 3. The operation of applying the adhesive onto the two tensile strength members 7 is thereby facilitated. However, the adhesive filling window 313 may be formed in the fixing housing 31 so as to open in the left-right direction, for example.

As illustrated in FIG. 9, the adhesive filling window 31B described above has a shape elongated along the front-rear direction (the longitudinal direction of the optical cable 3). This enables adhesive to be applied along the front-rear direction of the tensile strength members 7 inside the fixing housing 31, lengthens a region applied by the adhesive between the tensile strength members 7 and the inner wall of the fixing housing 31, and achieves strong bonding and fixing between the two counterparts. However, the adhesive filling window 31B may, for example, be formed as a square shaped opening as viewed from above.

The width of the adhesive filling window 31B described above in the left-right direction is wider than the width of the optical fiber 5 (the diameter of the optical fiber 5 including the covering). This gives good visibility through the adhesive filling window 31B, and facilitates operation of applying the adhesive. However, the adhesive filling window 31B may be configured such that the width of the adhesive filling window 31B in the left-right direction is narrower than the width of the optical fiber 5.

There are two of the projections 31C formed projecting rearwards (the optical cable side) at the rear end section of the fixing housing described above. Thus, as illustrated in FIG. 8B and FIG. 10, the outer covering of the flat optical cable can be gripped by these two projections. Positional misalignment of the fixing housing 31 with respect to the optical cable 3 prior to bonding (positional misalignment in a rotation direction in particular) can thereby be suppressed, facilitating the operation of filling adhesive through the adhesive filling window 31B.

The size of the insertion hole 31A described above is a size enabling the optical fiber 5 and the two tensile strength members 7 to be inserted therein, while being a size that does not allow the whole of the optical cable 3 to be inserted therein. When the optical cable 3 is not able to be inserted into the insertion hole 31A of the fixing housing 31 in this manner, then a limitation arises in that it is no longer possible to place the fixing housing 31 in advance rearward from the protruding portion of the optical cable 3 during assembly of the optical connector 10. To address this issue, the insertion hole 31A described above is configured to have a size enabling the ferrule 11 to pass through, and the fixing housing 31 can accordingly be inserted over from the front side of the ferrule 11 and attached after the optical fiber 5 has been fused (see FIG. 8A and FIG. 8B). Thus, such a limitation during assembly is permitted.

<Summary (4)>

The plug-side optical connector 10 described above includes the ferrule 11 (the plug-side ferrule) with the flange section 11B, and the inner housing 30 (the fixing housing 31 and the central housing 32) fixed to the optical cable. As illustrated in FIG. 7 and FIG. 10, the inner housing 30 includes the rear edge pressing section 33B (pressing section) to press the flange section 11B of the ferrule 11 from the rear side (the opposite side to the receptacle-side optical connector 100 side). This enables the ferrule 11 to be suppressed from moving rearward when the ferrule 11 and the receptacle-side ferrule 111 of the receptacle-side optical connector 100 abut each other (when the connector is connected). In comparison to a case in which the ferrule is configured to be retractable, there is no need in one or more embodiments for a space for allowing the ferrule 11 to be retractable, and thus it becomes possible to make the optical connector 10 compact.

As illustrated in FIG. 7, the inner housing 30 described above includes the fixing housing 31, and the first housing 33 and the second housing 34 attached to the front side of the fixing housing 31 (the receptacle-side optical connector 100 side), with the rear edge pressing section 33B formed to the first housing 33. As illustrated in FIG. 8A to FIG. 8D, after the optical fiber 5 has been fused, the fixing housing 31 is attached to the protruding portion of the optical cable 3, and the first housing 33 and the second housing 34 are attached to the fixing housing 31, enabling the rear edge pressing section 33B to be placed on the rear side of the flange section 11B of the ferrule 11. Since the inner housing 30 need not be inserted over the optical fiber 5 in advance prior to fusing, the operation of assembling the optical cable is simple. In addition, since the optical fiber 5 protruding from the optical cable 3 can be set in a fusion device even if the optical fiber 5 is short, it becomes possible to make the optical connector 10 compact.

As illustrated in FIG. 7, the engagement holes 31D are formed in the fixing housing 31 described above, with the first engagement tab 33C (engagement tab) formed to the first housing 33 and the second engagement tab 341B (engagement tab) formed to the second housing 34. As illustrated in FIG. 10, the first engagement tab 33C and the second engagement tab 341B engage with the engagement holes 31D of the fixing housing 31, so that positional misalignment of the first housing 33 and the second housing 34 with respect to the fixing housing 31 can be suppressed.

As illustrated in FIG. 7, the first housing 33 described above is a half-cylinder shaped member having the guide section 33D formed on the outer peripheral surface of first housing 33 along the front-rear direction (direction of connector attaching and detaching). Moreover, the second housing 34 includes the half-cylinder section 341 covering the outside of a part of the half-cylinder shaped first housing 33, and the guide groove (guide section: not illustrated in FIG. 7) is formed on the inner peripheral surface of half-cylinder section 341 along the front-rear direction. When the second housing 34 is attached to the first housing 33 as illustrated in FIG. 8D, movement of the second housing 34 with respect to the first housing 33 is restricted by the guide section in the up-down direction and the left-right direction. The second housing 34 is accordingly not liable to be misaligned with respect to the first housing 33, and the operation of attaching the second housing 34 is facilitated.

As illustrated in FIG. 10, the second housing 34 described above includes the pressing section 342A (another pressing section) pressing the flange section 11B of the ferrule 11 from the front side (the receptacle-side optical connector 100 side). The flange section 11B of the ferrule 11 is thereby pressed from both the front and rear sides by the rear edge pressing section 33B of the first housing 33 and the pressing section 342A of the second housing 34, enabling the position of the ferrule 11 to be fixed in the front-rear direction.

The plug-side optical connector 10 described above includes the plug-side coupling section 22 (the rotation section 21 and the insertion section 24A) to be coupled to the coupling section 122 of the receptacle-side optical connector 100, and the spring 42 (elastic member). Since the spring 42 is placed forward from the flange section 11B of the ferrule 11, the spring 42 does not need to be inserted over the optical fiber 5 in advance prior to the attachment of the ferrule 11 during assembly of the optical connector 10. As a result, the operation of assembling the optical connector becomes simple, and the optical fiber 5 protruding from the optical cable 3 can be set in a fusion device even if the optical fiber 5 is short, thereby enabling the optical connector 10 to be made compact.

Note that in one or more embodiments, the adhesive filling window 31B is formed in the fixing housing 31. However, the fixing housing 31 and the tensile strength members 7 of the optical cable 3 may be bonded together without providing the adhesive filling window 31B in the fixing housing 31, by internally filling adhesive through the insertion hole 31A. In such cases too, as long as the inner housing 30 includes the rear edge pressing section 33B (pressing section), the optical connector 10 can be made more compact than cases in which the ferrule is configured to be retractable.

Figure 11:
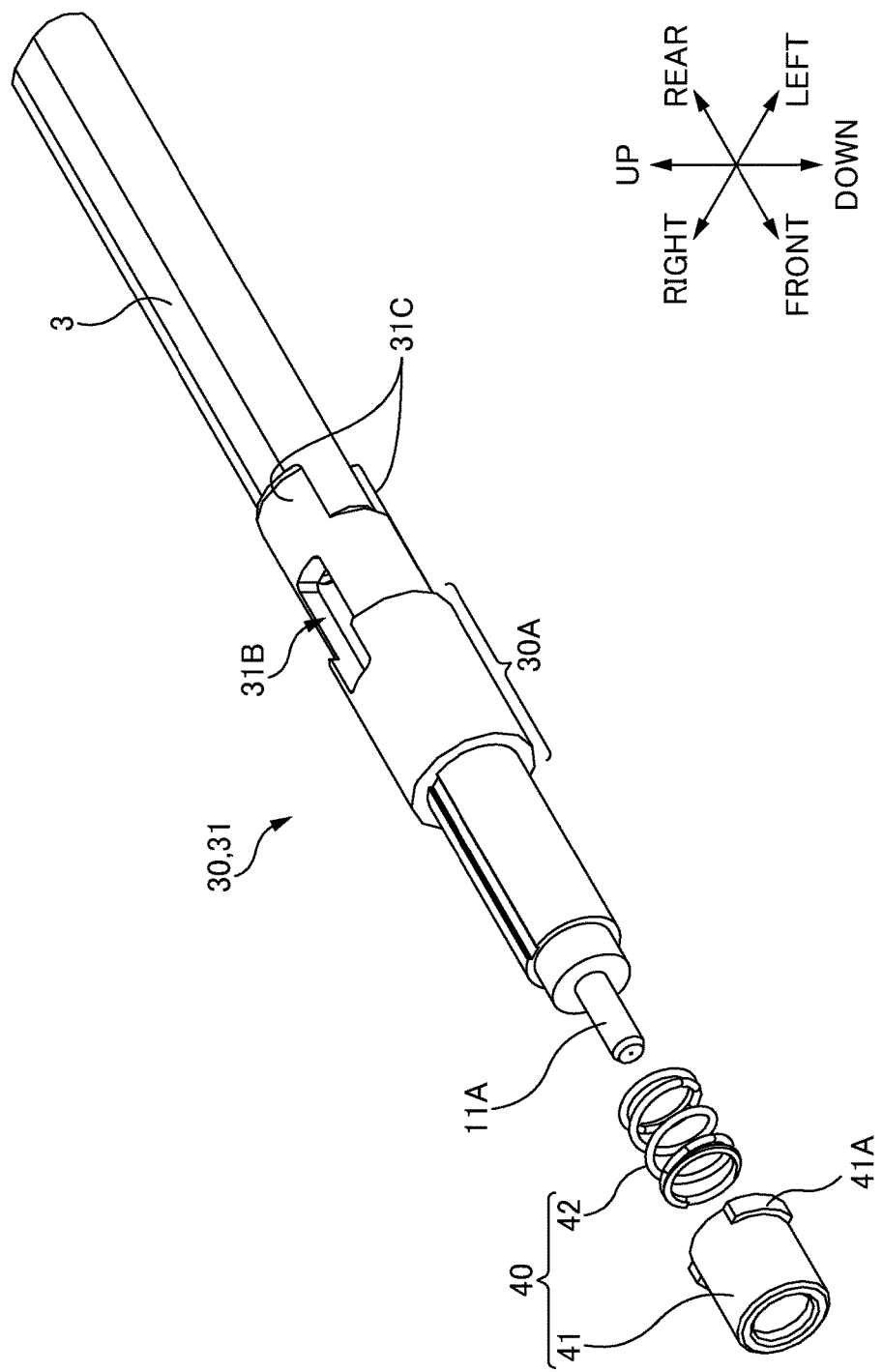
FIG. 11 is an explanatory diagram of an inner housing 30 and an imparting mechanism 40 according to one or more embodiments.

One or more embodiments of the inner housing 30 described above are configured from the fixing housing 31 and the central housing 32 (the first housing 33 and the second housing 34), and the spring 42 is disposed at the front side of the central housing 32. However, the placement of the spring 42 is not limited thereto. The shape of the inner housing 30 (or the fixing housing 31) is also not limited thereto. FIG. 11 is an explanatory diagram of an inner housing 30 and an imparting mechanism 40 according to one or more embodiments. Configuration other than that of the inner housing 30 (for example, the rotation section 21, the outer housing 23, and the like) is similar to that of one or more embodiments described above. In the inner housing 30 of one or more embodiments, a fixing housing 31 and the central housing 32 described above are integrally configured. In other words, the fixing housing 31 of one or more embodiments integrally constitutes the central housing 32 described above and is capable of accommodating the reinforcement tube 35 inside.

Also in one or more embodiments, since a spring 42 (elastic member) is placed forward from the flange section 11B of the ferrule 11, there is no need to insert the spring 42 over the optical fiber 5 in advance prior to attaching the ferrule 11 during assembly of the optical connector 10. As a result, the operation of assembling the optical connector becomes simple, and the optical fiber 5 protruding from the optical cable 3 can be set in a fusion device even if the optical fiber 5 is short, thereby enabling the optical connector 10 to be made compact.

The fixing housing 31 in one or more embodiments also includes an insertion hole 31A (not illustrated in FIG. 11) and the adhesive filling window 31B. The operation of fixing (bonding) the fixing housing 31 to the optical cable 3 is thereby facilitated.

Note that in one or more embodiments, the section corresponding to the central housing 32 described above (the first housing 33 and the second housing 34) is integrally configured, and the rear edge pressing section 33B of the first housing 33 described above is not formed. The fixing housing 31 of one or more embodiments is accordingly configured so that the fixing housing 31 can be inserted from the front side of the ferrule 11 after the optical fiber 5 has been fused.

In one or more embodiments described above, the adhesive filling window 31B is formed in the fixing housing 31. However, the fixing housing 31 may be bonded to the tensile strength members 7 of the optical cable 3 without providing the adhesive filling window 31B in the fixing housing 31, by internally filling adhesive through the insertion hole 31A. In such cases too, as long as the spring 42 (elastic member) is placed forward from the flange section 11B of the ferrule 11, the operation of assembling the optical connector becomes simple and the optical connector 10 can be made more compact.

Moreover, one or more embodiments described above are configured with the spring 42 placed forward from the flange section 11B of the ferrule 11. However, a configuration of one or more embodiments may be adopted in which the spring 42 is placed rearward from the flange section 11B of the ferrule 11 such that the ferrule 11 is retractable. In such a configuration too, as long as the fixing housing 31 includes the adhesive filling window 31B, the operation of fixing (bonding) the fixing housing 31 to the optical cable 3 is facilitated.

The central housing 32 configured from the first housing 33 and the second housing 34 is not limited to the shape in one or more embodiments described above.

Figure 12:
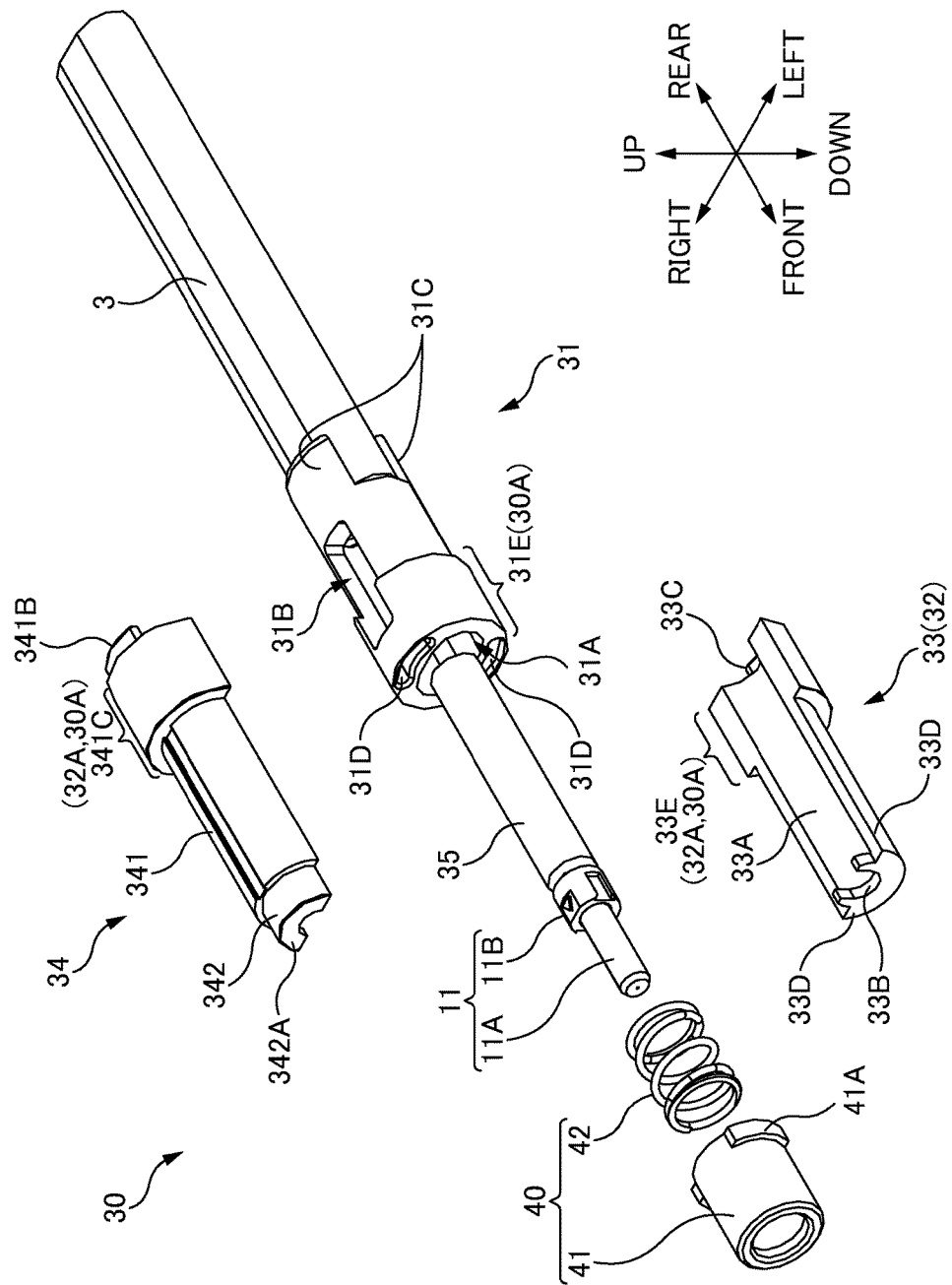
FIG. 12 is an explanatory diagram of a central housing according to one or more embodiments.

FIG. 12 is an explanatory diagram of the central housing 32 according to one or more embodiments. Configuration other than that of the central housing 32 (for example, the rotation section 21, the outer housing 23, and the like) is similar to that of one or more embodiments described above.

The first housing 33 and the second housing 34 of one ore more embodiments are each configured with a half-cylinder shaped half-split structure, and the central housing 32 is configured by mating an upper face of the first housing 33 and a lower face of the second housing 34 together in the up-down direction (in contrast thereto, in one or more embodiments described above, the inner peripheral surface of the half-cylinder section 341 of the second housing is configured so as to cover the outside of a part of the half-cylinder shaped first housing 33). Accordingly, the guide section 33D described above (see FIG. 7) is not formed in the first housing 33, and the guide groove is not formed on the inner peripheral surface of the second housing 34. In one or more embodiments, it is possible to make a front flange section 32A of the central housing 32 more compact in the radial direction.

In one or more embodiments, the rear edge pressing section 33B (pressing section) is formed to the first housing 33. The rear edge pressing section 33B (pressing section) is formed to the first housing 33 that configures the inner housing 30. Thus, in one or more embodiments, the optical connector 10 can be made more compact than cases in which the ferrule is configured to be retractable.

Moreover, in one or more embodiments, after the optical fiber 5 has been fused, the fixing housing 31 can be attached to the protruding portion of the optical cable 3, and the first housing 33 and the second housing 34 can be attached to the fixing housing 31. The inner housing 30 accordingly does not need to be inserted over the optical fiber 5 in advance prior to fusing, making the operation of assembling the optical cable simple, and enabling the optical fiber 5 protruding from the optical cable 3 to be set in a fusion device even if the optical fiber 5 is short, thereby enabling the optical connector 10 to be more compact.

One or more embodiments described above are merely to facilitate understanding of the invention, and are not meant to be interpreted in a manner limiting the scope of the invention. The invention can of course be modified and improved without departing from the gist thereof and the invention includes functional equivalents of such modifications and improvements.

<Ferrule>

In one or more embodiments described above, an SC connector is employed as the receptacle-side optical connector 100, and cylindrical ferrules that retain end sections of single core optical fibers are employed as the receptacle-side and plug-side ferrules 11, 111. However, instead of SC connectors, ST connectors, LC connectors, MU connectors or the like may be employed, and non-general-purpose connectors may also be employed. Moreover, instead of single core cylindrical ferrules, multi-core ferrules, for example MT ferrules, may also be employed.

REFERENCE SIGNS LIST

1: optical connector system,
3: optical cable (optical cable with connector),
5: optical fiber,
7: tensile strength members,
10: plug-side optical connector (optical connector),
11: ferrule,
11A: ferrule main body,
11B: flange section,
21: rotation section,
21A: entry part,
21B: locking part,
22: coupling section (rotation section 21 and insertion section 24A),
23: outer housing,
24: front housing,
24A: insertion section,
24B: support section,
24C: rear end face,
241: keyway,
25: fitting O-ring (waterproofing member),
26: rear housing,
26A: contact section,
26B: attachment section,
27: cap O-ring (another waterproofing member),
29: housing O-ring (yet another waterproofing member),
30: inner housing (housing),
30A: flange section,
31: fixing housing,
31A: insertion hole,
31B: adhesive filling window,
31C: projection,
31D: engagement hole,
31E: rear flange section,
32: central housing,
32A: front flange section,
33: first housing,
33A: first accommodation section,
33B: rear edge pressing section (pressing section),
33C: first engagement tab,
33D: guide section,
33E: first flange section,
34: second housing,
341: half-cylinder section,
341A: second accommodation section,
341B: second engagement tab,
341C: second flange section,
342: cylinder section,
342A: pressing section (another pressing section),
35: reinforcement tube,
40: imparting mechanism,
41: movable housing,
41A: flange section,
42: spring (elastic member),
51: boot,
52: shrinkable sleeve,
60: plug-side cap,
60A: hexagonal wrench section,
60B: through hole,
61: linking member,
100: receptacle-side optical connector,
110: connector main body,
111: ferrule,
112: housing section,
120: outer housing,
121: accommodation section,
122: coupling section,
122A: projection,
123: front sleeve section,
124: flange section,
125: packing,
130: inner housing,
131: latch section,
131A: sleeve section,
132: fixing section,
160: receptacle-side cap,
160A: keyway,
160B: hexagonal hole,
161: linking member.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A plug-side optical connector comprising:
   an insertion section that is inserted inside a cylindrical coupling section of a receptacle-side optical connector;
   a rotation section that is coupled to the coupling section of the receptacle-side optical connector and is rotatable outside the insertion section; and
   a first waterproofing member that is disposed on an outer peripheral surface of the insertion section inside the rotation section and contacts an inner peripheral surface of the coupling section of the receptacle-side optical connector when the insertion section is inserted inside the coupling section of the receptacle-side optical connector,
   wherein an outer peripheral surface of the cylindrical coupling section includes a first projection that engage with a first groove disposed on an inner peripheral surface of the rotation section.

2. The plug-side optical connector according to claim 1, wherein
   the insertion section is formed to a housing, and
   the plug-side optical connector further comprises a second waterproofing member that is disposed on an outer peripheral surface of the housing and contacts an inner peripheral surface of a cap when the cap is installed to cover the insertion section and the rotation section.

3. The plug-side optical connector according to claim 2, wherein
the housing includes a front housing on a side of the receptacle-side optical connector and a rear housing on the opposite side to the side of the receptacle-side optical connector, and
the plug-side optical connector further comprises a third waterproofing member disposed at a connection section between the front housing and the rear housing.

4. The plug-side optical connector according to claim 3, wherein
a second projection is formed at an inside of a cylindrical coupling section of the receptacle-side optical connector,
a second groove for the second projection is formed on the outer peripheral surface of the insertion section, and
the first waterproofing member is disposed on the opposite side to the side of the receptacle-side optical connector as viewed from the second groove.

5. The plug-side optical connector according to claim 1, further comprising:
a ferrule including a flange section;
a housing that covers at least a part of an optical fiber that extends from the ferrule; and
an elastic member that is disposed on the side of the receptacle-side optical connector with respect to the flange section and is compressed and deformed between the housing and the receptacle-side optical connector to generate repulsion force when connected to the receptacle-side optical connector.

6. The plug-side optical connector according to claim 5, wherein a bayonet-type coupling mechanism includes the insertion section and the rotation section.

7. The plug-side optical connector according to claim 5, wherein the ferrule is inserted into a split sleeve of the receptacle-side optical connector when connected to the receptacle-side optical connector.

8. The plug-side optical connector according to claim 5, wherein the elastic member is attachable to the side of the receptacle-side optical connector of the housing after an optical fiber to which the ferrule has been attached in advance and an optical fiber protruding from an optical cable are fused together.

9. The plug-side optical connector according to claim 8, wherein the housing is attachable to a protruding portion of the optical cable after an optical fiber to which the ferrule has been attached in advance and the optical fiber protruding from the optical cable are fused together.

10. The plug-side optical connector according to claim 9, wherein
the housing includes an insertion hole through which the optical fiber is inserted, and
the insertion hole has a size smaller than the optical cable and larger than the ferrule.

11. The plug-side optical connector according to claim 5, wherein
another housing is provided on the side of the receptacle-side optical connector of the elastic member, and
the another housing covers at least a part of the ferrule.

12. The plug-side optical connector according to claim 1, wherein
the plug-side optical connector is attached to an end section of an optical cable that includes an optical fiber and a tensile strength member,
the plug-side optical connector includes:
a ferrule that retains an end section of the optical fiber, and
a fixing housing that is fixed to the optical cable while covering at least a part of an optical fiber extending from the ferrule, and
the fixing housing includes:
an insertion hole with an internal capacity that enables the optical fiber and the tensile strength member to be disposed therein, and
an adhesive filling window that communicates the interior of the insertion hole with the exterior of the fixing housing and that enables an adhesive to be filled inside the insertion hole.

13. The plug-side optical connector according to claim 12, wherein
the optical fiber is disposed between two of the tensile strength members in the optical cable, and
the adhesive filling window is formed to the fixing housing and opens in a direction perpendicular to an arrangement direction of the two tensile strength members and a longitudinal direction of the optical cable.

14. The plug-side optical connector according to claim 12, wherein the adhesive filling window has a shape elongated along a longitudinal direction of the optical cable.

15. The plug-side optical connector according to claim 12, wherein a width of the adhesive filling window is wider than a width of the optical fiber.

16. The plug-side optical connector according to claim 12, wherein
two third projections that project toward the optical cable side are formed to a rear end section of the fixing housing, and
an outer covering of the optical cable that have a flattened profile is gripped by the two third projections.

17. The plug-side optical connector according to claim 1, further comprising:
a plug-side ferrule that includes a flange section and that abuts a ferrule of the receptacle-side optical connector; and
a housing that is fixed to an optical cable and includes a pressing section that presses the flange section of the plug-side ferrule from the opposite side to the side of the receptacle-side optical connector.

18. The plug-side optical connector according to claim 17, wherein
the housing includes:
a fixing housing that is fixed to the optical cable; and
a first housing and a second housing that are attached to the side of the receptacle-side optical connector of the fixing housing,
the pressing section is formed to the first housing,
after an optical fiber to which the plug-side ferrule is attached in advance and the optical fiber protruding from the optical cable have been fused together, the fixing housing is attached to the protruding portion of the optical cable, the first housing and the second housing are attached to the fixing housing, and the pressing section can be disposed on the opposite side to the flange section.

19. The plug-side optical connector according to claim 18, wherein
engagement holes are formed in the fixing housing, and engagement tabs that project toward the side of the fixing housing are formed to the first housing and the second housing to respectively engage with the engagement holes.

20. The plug-side optical connector according to claim 18, wherein
  the first housing is a half-cylinder shaped member,
  the second housing includes a half-cylinder section that covers a part of the half-cylinder shaped first housing from the outside,
  a guide section is formed on an outer peripheral surface of the first housing and on an inner peripheral surface of the half-cylinder section of the second housing, and
  the guide section is formed along an attachment or detachment direction of the connector.

21. The plug-side optical connector according to claim 18, wherein the second housing includes another pressing section that presses the flange section of the plug-side ferrule from the side of the receptacle-side optical connector.

22. An optical connector system comprising:
  a receptacle-side optical connector; and
  a plug-side optical connector, wherein
  the receptacle-side optical connector includes:
    a cylindrical coupling section;
  the plug-side optical connector includes:
    an insertion section that is inserted inside the cylindrical coupling section of the receptacle-side optical connector;
    a rotation section that is coupled to the coupling section of the receptacle-side optical connector and is rotatable outside the insertion section; and
    a waterproofing member that is disposed on an outer peripheral surface of the insertion section inside the rotation section and contacts an inner peripheral surface of the coupling section of the receptacle-side optical connector when the insertion section is inserted inside the coupling section of the receptacle-side optical connector,
  wherein an outer peripheral surface of the cylindrical coupling section includes a first projection that engage with a first groove disposed on an inner peripheral surface of the rotation section.

* * * * *